(12) United States Patent
Vigneau et al.

(10) Patent No.: US 10,817,406 B2
(45) Date of Patent: Oct. 27, 2020

(54) DEBUGGING AN EXECUTABLE CONTROL FLOW GRAPH THAT SPECIFIES CONTROL FLOW

(71) Applicant: Ab Initio Technology LLC, Lexington, MA (US)

(72) Inventors: Joyce L. Vigneau, Stoneham, MA (US); Mark Staknis, Concord, MA (US); Xin Li, Nashua, NH (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 15/942,022

(22) Filed: Mar. 30, 2018

(65) Prior Publication Data

US 2019/0303271 A1   Oct. 3, 2019

(51) Int. Cl.
*G06F 11/36* (2006.01)
*G06F 11/32* (2006.01)

(52) U.S. Cl.
CPC ........ *G06F 11/3664* (2013.01); *G06F 11/323* (2013.01); *G06F 11/362* (2013.01);
(Continued)

(58) Field of Classification Search
CPC ............. G06F 11/3664; G06F 11/3636; G06F 11/323; G06F 11/3656; G06F 11/3696; G06F 11/362
(Continued)

(56) References Cited

U.S. PATENT DOCUMENTS

| | | | |
|---|---|---|---|
| 5,038,348 A | 8/1991 | Yoda et al. | 371/19 |
| 5,893,105 A | 4/1999 | MacLennan | 707/102 |

(Continued)

FOREIGN PATENT DOCUMENTS

| | | |
|---|---|---|
| CA | 2420479 | 8/2004 |
| WO | 2000/77628 | 12/2000 |

OTHER PUBLICATIONS

Buy et al., "A Petri-Net-Based Approach to Real-Time Program Analysis", Proceedings of the Seventh International Workshop on Software Specification and Design, pp. 56-60, Dec. 1993, IEEE Computer Society Press.

(Continued)

*Primary Examiner* — Wei Y Zhen
*Assistant Examiner* — Brahim Bourzik
(74) *Attorney, Agent, or Firm* — Fish & Richardson P.C.

(57) ABSTRACT

A computer-implemented method for debugging an executable control flow graph that specifies control flow among a plurality of functional modules, with the control flow being represented as transitions among the plurality of functional modules, the computer-implemented method including: specifying a position in the executable control flow graph at which execution of the executable control flow graph is to be interrupted; wherein the specified position represents a transition to a given functional module, a transition to a state in which contents of the given functional module are executed or a transition from the given functional module; starting execution of the executable control flow graph in an execution environment; and at a point of execution representing the specified position, interrupting execution of the executable control flow graph; and providing data representing one or more attributes of the execution environment in which the given functional module is being executed.

32 Claims, 23 Drawing Sheets

(52) U.S. Cl.
CPC ...... *G06F 11/3636* (2013.01); *G06F 11/3656* (2013.01); *G06F 11/3696* (2013.01)

(58) Field of Classification Search
USPC ........................................................ 717/125
See application file for complete search history.

(56) References Cited

U.S. PATENT DOCUMENTS

| | | | | |
|---|---|---|---|---|
| 5,913,055 | A | | 6/1999 | Yoshida et al. ............... 395/580 |
| 5,966,072 | A | * | 10/1999 | Stanfill ..................... G06F 9/54 |
| | | | | 340/440 |
| 6,016,555 | A | | 1/2000 | Deao et al. ..................... 714/35 |
| 6,263,456 | B1 | * | 7/2001 | Boxall .................. G06F 11/362 |
| | | | | 709/217 |
| 7,155,708 | B2 | | 12/2006 | Hammes et al. ............. 717/155 |
| 2002/0120919 | A1 | * | 8/2002 | Aizenbud-Reshef ..... G06F 8/34 |
| | | | | 717/127 |
| 2003/0023955 | A1 | * | 1/2003 | Bates .................. G06F 11/3664 |
| | | | | 717/129 |
| 2003/0041315 | A1 | | 2/2003 | Bates et al. |
| 2003/0061600 | A1 | * | 3/2003 | Bates .................. G06F 11/3664 |
| | | | | 717/133 |
| 2004/0031019 | A1 | * | 2/2004 | Lamanna ............ G06F 11/3664 |
| | | | | 717/125 |
| 2006/0048098 | A1 | * | 3/2006 | Gatlin ................... G06F 11/321 |
| | | | | 717/124 |
| 2008/0209405 | A1 | * | 8/2008 | Roberts ................. G06F 11/362 |
| | | | | 717/129 |
| 2010/0192132 | A1 | * | 7/2010 | Yuan ................... G06F 11/0715 |
| | | | | 717/128 |
| 2013/0104107 | A1 | | 4/2013 | Desmet et al. ............... 717/125 |
| 2014/0344790 | A1 | * | 11/2014 | Bates .................. G06F 11/3636 |
| | | | | 717/129 |
| 2015/0033134 | A1 | * | 1/2015 | Bragstad ................. H04L 67/36 |
| | | | | 715/736 |

OTHER PUBLICATIONS

"CA Workload Automation AE & Workload Control Center", Documentation Powered by DocOps, CA WCC Quick View Application, last updated May 9, 2017, 7 pages.
"CA Workload Automation AE & Workload Control Center", Documentation Powered by DocOps, Manage Jobs in Quick View, last updated Apr. 13, 2017, 16 pages.
"CA Workload Automation AE & Workload Control Center", Documentation Powered by DocOps, View Consolidated Job Details in Quick View, last updated Apr. 11, 2017, 7 pages.
"Control-M Administrator Guide", bmcsoftware, Sep. 2008, 558 pages.
"Debugging the Scheduler", Aug. 9, 2017, Episerver, 1 page.
"Debugging the Scheduler Application", BMC Patrol for UNIX and Linux 9.12—BMC Documentation, Aug. 9, 2017, 2 pages.
Lopez et al., "A Suite of Petri Net Based Tools for Monitoring and Debugging Distributed Autonomous Systems", Systemics, Cybernetics and Informatics vol. 10, No. 4, ISN:1690-4524, 24 pages, 2012.
Kharitonov et al., "Towards Petri Nets Application in Parallel Program Debugging", The 6th Asian Computaitional Fluid Dynamics Conference Taiwan, Oct. 24-Oct. 27, 2005, 5 pages.
"Using Breakpoints", Visual Studio 2015, 11 pages.
The ABCs of CA Workload Automation, CA Technologies, 9 pages (2016).
Wimmer et al., "Reviving QVT Relation: Model-based Debugging Using Colored Petri Nets", Vienna University of Technology, Austria, 6 pages (2009).
International Search Report and Written Opinion issued in PCT/US2019/022066 dated Jun. 21, 2019.

* cited by examiner

FIG. 1E

Breakpoint Inspector: Run the Main Daily Process - Breakpoint

| Name | Value |
|---|---|
| ⊳DATA SOURCE | /inputsrc#dat — 4a |

Breakpoint Inspector: Run the Main Daily Process - Breakpoint

| Name | Value |
|---|---|
| ⊳DATA SOURCE | /inputsrc.dat — 5a |

CONTINUE — 5b

5d

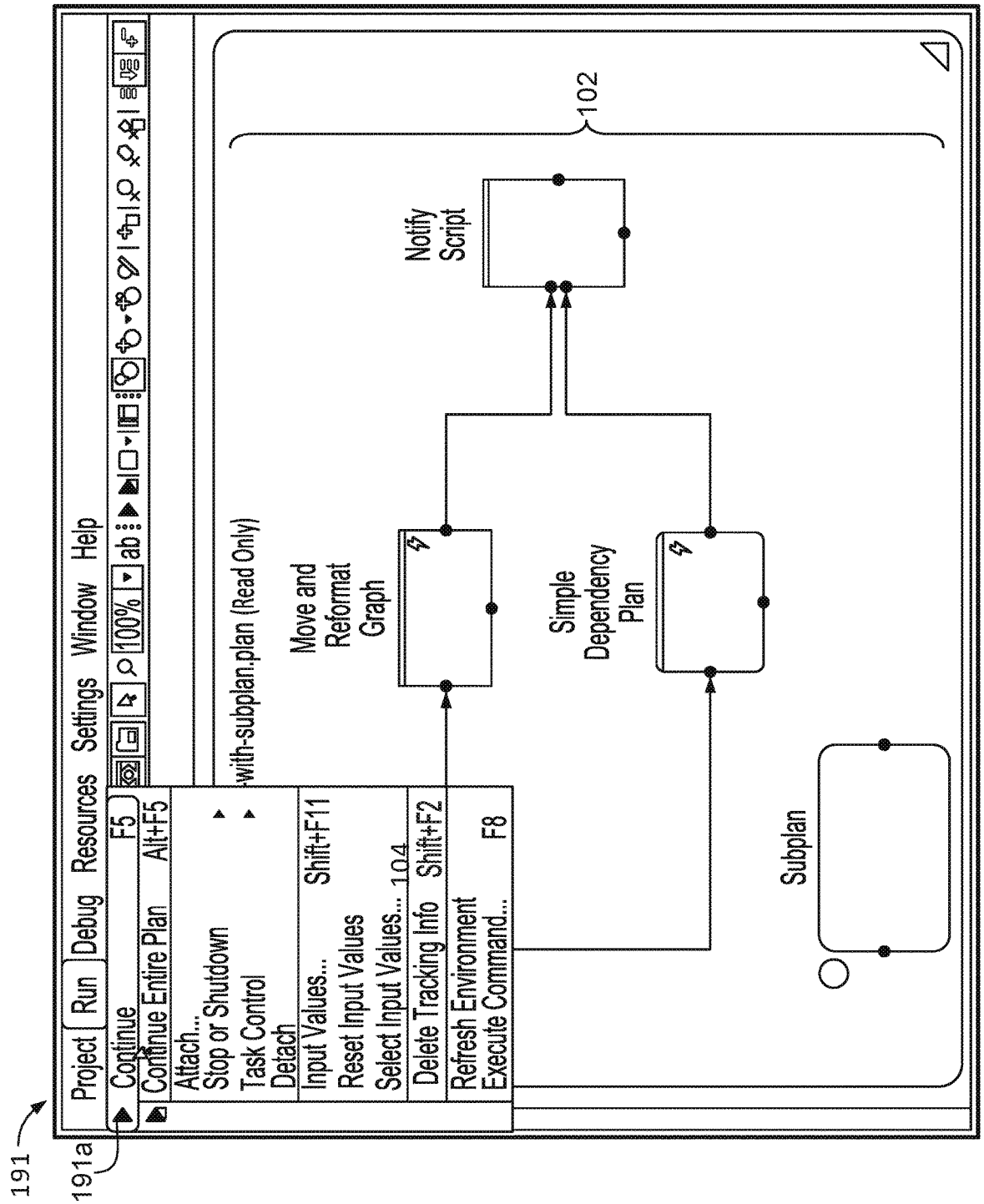

DEBUGGING AN EXECUTABLE CONTROL FLOW GRAPH THAT SPECIFIES CONTROL FLOW

TECHNICAL FIELD

The present description relates to methods, system and computer-readable media for debugging an executable control flow graph that specifies control flow among a plurality of functional modules.

BACKGROUND

A debugger or debugging tool is a computer program that is used to test and debug other computer programs.

SUMMARY

In a general aspect 1, described herein is a computer-implemented method for debugging an executable control flow graph that specifies control flow among a plurality of functional modules, with the control flow being represented as transitions among the plurality of functional modules, with each functional module being configured to execute one or more actions on a computer system, the computer-implemented method including: specifying a position in the executable control flow graph at which execution of the executable control flow graph is to be interrupted; wherein the specified position represents a transition to a given functional module, a transition to a state in which contents of the given functional module are executed or a transition from the given functional module; starting execution of the executable control flow graph in an execution environment; and at a point of execution representing the specified position, interrupting execution of the executable control flow graph; and providing data representing one or more attributes of the execution environment in which the given functional module is being executed.

In an aspect 2 according to aspect 1, the executable control flow graph is represented as a plurality of hierarchical levels, with the executable control flow graph itself being represented in a first one of the hierarchical levels, and with each functional module being represented in a second one of the hierarchical levels that is distinct from the first one of the hierarchical levels that includes the executable control flow graph.

In an aspect 3 according to any one of aspects 1 to 2, a functional module is configured to perform methods that perform the one or more actions of the functional module, wherein each of the methods configured to be performed is represented in a third one of the hierarchical levels that differs from each of the first one of the hierarchical levels and the second one of the hierarchical levels.

In an aspect 4 according to any one of aspects 1 to 3, the specified position is a first specified position, wherein the executable control flow graph includes transitions among the methods configured to be performed, and the method further includes: configuring the executable control flow graph to interrupt execution of the executable control flow graph at a second specified position that represents a transition to a given method of the functional module, before execution of contents of the given method or a transition from the given method; at a point of execution representing the second specified position, interrupting execution of the executable control flow graph and providing data representing one or more attributes of runtime environment in which the given method is executed.

In an aspect 5 according to any one of aspects 1 to 4, an attribute of the given method includes a local environment of a system executing the given method.

In an aspect 6 according to any one of aspects 1 to 5, a first computer system executes the executable control flow graph, wherein a second computer system executes a spawned process of the given functional module, wherein the first computer system differs from the second computer system, and wherein the method further includes: responsive to the interrupting, causing display of a user interface that renders one or more visual representations of one or more attributes of a runtime environment of the second computer system.

In an aspect 7 according to any one of aspects 1 to 6, the method further includes providing a graphical user interface that when rendered on a display device displays one or more controls for configuring interruption of the executable control flow graph.

In an aspect 8 according to any one of aspects 1 to 7, specifying the position includes inserting a breakpoint into the executable control flow graph at the specified position.

In an aspect 9 according to any one of aspects 1 to 8, the given functional module is a first functional module, and the method further includes: while the executable control flow graph is interrupted, modifying one or more values of one or more attributes of the first functional module, wherein the one or more values of those one or more attributes are accessed by one or more second functional modules from the first functional module; resuming execution of the executable control flow graph; and modifying behavior of the executable control flow graph by causing the one or more second functional modules to execute with the one or more modified values of the one or more attributes.

In an aspect 10 according to any one of aspects 1 to 9, an attribute is a parameter.

In an aspect 11 according to any one of aspects 1 to 10, the given functional module is a conditional functional module that is configured to perform one or more first actions upon satisfaction of a condition and to perform one or more second actions upon failure of satisfaction of the condition, the method further includes: modifying control flow of the executable control flow graph by altering a success or failure state of the conditional functional module.

In an aspect 12 according to any one of aspects 1 to 11, the executable control flow graph is configured to loop, and the method further includes: configuring the executable control flow graph such that each iteration of the loop or a particular iteration of the loop is interrupted before, in or after execution of the executable control flow graph.

In an aspect 13 according to any one of aspects 1 to 12, the executable control flow graph includes a sub-executable control flow graph that is configured to loop, and wherein the method further includes: configuring the sub-executable control flow graph such that each iteration of the loop or a particular iteration of the loop is interrupted.

In an aspect 14 according to any one of aspects 1 to 13, the method further includes configuring the executable control flow graph such that execution of the executable control flow graph is interrupted at the specified position when a particular condition is satisfied.

In an aspect 15 according to any one of aspects 1 to 14, the method further includes configuring the executable control flow graph to interrupt execution of the executable control flow graph on failure of any functional module.

In an aspect 16 according to any one of aspects 1 to 15, the given functional module is a first functional module that is configured to start a second functional module, and the method further includes: configuring the executable control flow graph to pause execution at a start of execution of the second functional module.

In an aspect 17 according to any one of aspects 1 to 16, the executable control flow graph includes a graphical layer and a control processing layer, the graphical layer includes visuals for a graphical user interface and a visual program in a visual programming language that is programmed with the visuals, with the visual programming language being for specifying the control flow, wherein the control processing layer includes functional modules, methods, underlying data structures used in executing the methods, and code that executes the methods using the underlying data structures to effect the control flow specified by the visual programming language.

In an aspect 18 according to any one of aspects 1 to 17, the method further includes executing the graphical layer by rendering the graphical user interface with the visuals; receiving, through the graphical user interface, data representing user manipulation of one or more of the visuals displayed in the graphical user interface, with the received data representing the visual program in the visual programming language; and executing the control processing layer in accordance with the visual program created in the graphical layer, with execution of the control processing layer including executing one or more functional modules specified by the visual program, with execution of a functional module causing execution of a method of that functional module by executing code using one or more data structures of the method to effect the control flow specified by the visual programming language.

In an aspect 19 according to any one of aspects 1 to 18, a particular functional module represents a controlled application included in a data processing layer, the method further includes: executing a particular method of the particular functional module; and responsive to executing the particular method, launching the controlled application.

In a general aspect 20, a computer-implemented method for debugging an executable control flow graph that specifies control flow among a plurality of functional modules, with the plurality of functional modules being represented by graphical program elements and with the control flow being represented by transitions between the graphical program elements, with each functional module being configured to execute one or more actions on a computer system, the computer-implemented method including: specifying a position in the executable control flow graph at which execution of the executable control flow graph is to be interrupted; wherein the specified position represents a transition to a given functional module of the plurality of functional modules, a transition to a state in which some of the one or more actions of the given functional module start executing or a transition from the given functional module; starting execution of the executable control flow graph in an execution environment, wherein the execution environment is hosted on one or more computers and is configured to execute the plurality of functional modules; and at a point in time of the execution representing the specified position, interrupting the execution of the executable control flow graph; and providing data representing one or more attributes of the execution environment prevailing at the point in time.

In a general aspect 21, described herein is one or more machine-readable hardware storage devices storing one or more instructions for debugging an executable control flow graph that specifies control flow among a plurality of functional modules, with the control flow being represented as transitions among the plurality of functional modules, with each functional module being configured to execute one or more actions on a computer system, the one or more instructions being executable by one or more processing devices to perform operations including: specifying a position in the executable control flow graph at which execution of the executable control flow graph is to be interrupted; wherein the specified position represents a transition to a given functional module, a transition to a state in which contents of the given functional module are executed or a transition from the given functional module; starting execution of the executable control flow graph in an execution environment; and at a point of execution representing the specified position, interrupting execution of the executable control flow graph; and providing data representing one or more attributes of the execution environment in which the given functional module is being executed.

In an aspect 22 according to aspect 21, the executable control flow graph is represented as a plurality of hierarchical levels, with the executable control flow graph itself being represented in a first one of the hierarchical levels, and with each functional module being represented in a second one of the hierarchical levels that is distinct from the first one of the hierarchical levels that includes the executable control flow graph.

In an aspect 23 according to any one of aspects 21 to 22, a functional module is configured to perform methods that perform the one or more actions of the functional module, wherein each of the methods configured to be performed is represented in a third one of the hierarchical levels that differs from each of the first one of the hierarchical levels and the second one of the hierarchical levels.

In an aspect 24 according to any one of aspects 21 to 23, the specified position is a first specified position, wherein the executable control flow graph includes transitions among the methods configured to be performed, and the one or more operations further include: configuring the executable control flow graph to interrupt execution of the executable control flow graph at a second specified position that represents a transition to a given method of the functional module, before execution of contents of the given method or a transition from the given method; at a point of execution representing the second specified position, interrupting execution of the executable control flow graph and providing data representing one or more attributes of runtime environment in which the given method is executed.

In an aspect 25 according to any one of aspects 21 to 24, an attribute of the given method includes a local environment of a system executing the given method.

In an aspect 26 according to any one of aspects 21 to 25, a first computer system executes the executable control flow graph, wherein a second computer system executes a spawned process of the given functional module, wherein the first computer system differs from the second computer system, and the one or more operations further include: responsive to the interrupting, causing display of a user interface that renders one or more visual representations of one or more attributes of a runtime environment of the second computer system.

In an aspect 27 according to any one of aspects 21 to 26, the one or more operations further include providing a graphical user interface that when rendered on a display device displays one or more controls for configuring interruption of the executable control flow graph.

In an aspect 28 according to any one of aspects 21 to 27, specifying the position includes inserting a breakpoint into the executable control flow graph at the specified position.

In an aspect 29 according to any one of aspects 21 to 28, the given functional module is a first functional module, and the one or more operations further include: while the executable control flow graph is interrupted, modifying one or more values of one or more attributes of the first functional module, wherein the one or more values of those one or more attributes are accessed by one or more second functional modules from the first functional module; resuming execution of the executable control flow graph; and modifying behavior of the executable control flow graph by causing the one or more second functional modules to execute with the one or more modified values of the one or more attributes.

In an aspect 30 according to any one of aspects 21 to 29, an attribute is a parameter.

In an aspect 31 according to any one of aspects 21 to 30, the given functional module is a conditional functional module that is configured to perform one or more first actions upon satisfaction of a condition and to perform one or more second actions upon failure of satisfaction of the condition, the one or more operations further include: modifying control flow of the executable control flow graph by altering a success or failure state of the conditional functional module.

In an aspect 32 according to any one of aspects 21 to 31, the executable control flow graph is configured to loop, and the one or more operations further include: configuring the executable control flow graph such that each iteration of the loop or a particular iteration of the loop is interrupted before, in or after execution of the executable control flow graph.

In an aspect 33 according to any one of aspects 21 to 32, the executable control flow graph includes a sub-executable control flow graph that is configured to loop, and wherein the one or more operations further include: configuring the sub-executable control flow graph such that each iteration of the loop or a particular iteration of the loop is interrupted.

In an aspect 34 according to any one of aspects 21 to 33, the one or more operations further include configuring the executable control flow graph such that execution of the executable control flow graph is interrupted at the specified position when a particular condition is satisfied.

In an aspect 35 according to any one of aspects 21 to 34, the one or more operations further include configuring the executable control flow graph to interrupt execution of the executable control flow graph on failure of any functional module.

In an aspect 36 according to any one of aspects 21 to 35, the given functional module is a first functional module that is configured to start a second functional module, and the one or more operations further include: configuring the executable control flow graph to pause execution at a start of execution of the second functional module.

In an aspect 37 according to any one of aspects 21 to 36, the executable control flow graph includes a graphical layer and a control processing layer, the graphical layer includes visuals for a graphical user interface and a visual program in a visual programming language that is programmed with the visuals, with the visual programming language being for specifying the control flow, wherein the control processing layer includes functional modules, methods, underlying data structures used in executing the methods, and code that executes the methods using the underlying data structures to effect the control flow specified by the visual programming language.

In an aspect 38 according to any one of aspects 21 to 37, the one or more operations further include executing the graphical layer by rendering the graphical user interface with the visuals; receiving, through the graphical user interface, data representing user manipulation of one or more of the visuals displayed in the graphical user interface, with the received data representing the visual program in the visual programming language; and executing the control processing layer in accordance with the visual program created in the graphical layer, with execution of the control processing layer including executing one or more functional modules specified by the visual program, with execution of a functional module causing execution of a method of that functional module by executing code using one or more data structures of the method to effect the control flow specified by the visual programming language.

In an aspect 39 according to any one of aspects 21 to 38, a particular functional module represents a controlled application included in a data processing layer, the one or more operations further include: executing a particular method of the particular functional module; and responsive to executing the particular method, launching the controlled application.

In a general aspect 40, one or more machine-readable storing one or more instructions for debugging an executable control flow graph that specifies control flow among a plurality of functional modules, with the plurality of functional modules being represented by graphical program elements and with the control flow being represented by transitions between the graphical program elements, with each functional module being configured to execute one or more actions on a computer system, the one or more instructions being executable by one or more processing devices to perform operations including: specifying a position in the executable control flow graph at which execution of the executable control flow graph is to be interrupted; wherein the specified position represents a transition to a given functional module of the plurality of functional modules, a transition to a state in which some of the one or more actions of the given functional module start executing or a transition from the given functional module; starting execution of the executable control flow graph in an execution environment, wherein the execution environment is hosted on one or more computers and is configured to execute the plurality of functional modules; and at a point in time of the execution representing the specified position, interrupting the execution of the executable control flow graph; and providing data representing one or more attributes of the execution environment prevailing at the point in time.

In a general aspect 41, described herein is a data processing system for debugging an executable control flow graph that specifies control flow among a plurality of functional modules, with the control flow being represented as transitions among the plurality of functional modules, with each functional module being configured to execute one or more actions on a computer system, the data processing system including one or more processing devices and one or more machine-readable hardware storage devices storing one or more instructions that are executable by the one or more processing devices to perform operations including: specifying a position in the executable control flow graph at which execution of the executable control flow graph is to be interrupted; wherein the specified position represents a transition to a given functional module, a transition to a state in which contents of the given functional module are executed or a transition from the given functional module; starting execution of the executable control flow graph in an execution environment; and at a point of execution representing the specified position, interrupting execution of the executable control flow graph; and providing data representing one or more attributes of the execution environment in which the given functional module is being executed.

In an aspect 42 according to aspect 41, the executable control flow graph is represented as a plurality of hierarchical levels, with the executable control flow graph itself being represented in a first one of the hierarchical levels, and with each functional module being represented in a second one of the hierarchical levels that is distinct from the first one of the hierarchical levels that includes the executable control flow graph.

In an aspect 43 according to any one of aspects 41 to 42, a functional module is configured to perform methods that perform the one or more actions of the functional module, wherein each of the methods configured to be performed is represented in a third one of the hierarchical levels that differs from each of the first one of the hierarchical levels and the second one of the hierarchical levels.

In an aspect 44 according to any one of aspects 41 to 43, the specified position is a first specified position, wherein the executable control flow graph includes transitions among the methods configured to be performed, and the one or more operations further include: configuring the executable control flow graph to interrupt execution of the executable control flow graph at a second specified position that represents a transition to a given method of the functional module, before execution of contents of the given method or a transition from the given method; at a point of execution representing the second specified position, interrupting execution of the executable control flow graph and providing data representing one or more attributes of runtime environment in which the given method is executed.

In an aspect 45 according to any one of aspects 41 to 44, an attribute of the given method includes a local environment of a system executing the given method.

In an aspect 46 according to any one of aspects 41 to 45, a first computer system executes the executable control flow graph, wherein a second computer system executes a spawned process of the given functional module, wherein the first computer system differs from the second computer system, and the one or more operations further include: responsive to the interrupting, causing display of a user interface that renders one or more visual representations of one or more attributes of a runtime environment of the second computer system.

In an aspect 47 according to any one of aspects 41 to 46, the one or more operations further include providing a graphical user interface that when rendered on a display device displays one or more controls for configuring interruption of the executable control flow graph.

In an aspect 48 according to any one of aspects 41 to 47, specifying the position includes inserting a breakpoint into the executable control flow graph at the specified position.

In an aspect 49 according to any one of aspects 41 to 48, the given functional module is a first functional module, and the one or more operations further include: while the executable control flow graph is interrupted, modifying one or more values of one or more attributes of the first functional module, wherein the one or more values of those one or more attributes are accessed by one or more second functional modules from the first functional module; resuming execution of the executable control flow graph; and modifying behavior of the executable control flow graph by causing the one or more second functional modules to execute with the one or more modified values of the one or more attributes.

In an aspect 50 according to any one of aspects 41 to 49, an attribute is a parameter.

In an aspect 51 according to any one of aspects 41 to 50, the given functional module is a conditional functional module that is configured to perform one or more first actions upon satisfaction of a condition and to perform one or more second actions upon failure of satisfaction of the condition, the one or more operations further include: modifying control flow of the executable control flow graph by altering a success or failure state of the conditional functional module.

In an aspect 52 according to any one of aspects 41 to 51, the executable control flow graph is configured to loop, and the one or more operations further include: configuring the executable control flow graph such that each iteration of the loop or a particular iteration of the loop is interrupted before, in or after execution of the executable control flow graph.

In an aspect 53 according to any one of aspects 41 to 52, the executable control flow graph includes a sub-executable control flow graph that is configured to loop, and wherein the one or more operations further include: configuring the sub-executable control flow graph such that each iteration of the loop or a particular iteration of the loop is interrupted.

In an aspect 54 according to any one of aspects 41 to 53, the one or more operations further include configuring the executable control flow graph such that execution of the executable control flow graph is interrupted at the specified position when a particular condition is satisfied.

In an aspect 55 according to any one of aspects 41 to 54, the one or more operations further include configuring the executable control flow graph to interrupt execution of the executable control flow graph on failure of any functional module.

In an aspect 56 according to any one of aspects 41 to 55, the given functional module is a first functional module that is configured to start a second functional module, and the one or more operations further include: configuring the executable control flow graph to pause execution at a start of execution of the second functional module.

In an aspect 57 according to any one of aspects 41 to 56, the executable control flow graph includes a graphical layer and a control processing layer, the graphical layer includes visuals for a graphical user interface and a visual program in a visual programming language that is programmed with the visuals, with the visual programming language being for specifying the control flow, wherein the control processing layer includes functional modules, methods, underlying data structures used in executing the methods, and code that executes the methods using the underlying data structures to effect the control flow specified by the visual programming language.

In an aspect 58 according to any one of aspects 41 to 57, the one or more operations further include executing the graphical layer by rendering the graphical user interface with the visuals; receiving, through the graphical user interface, data representing user manipulation of one or more of the visuals displayed in the graphical user interface, with the received data representing the visual program in the visual programming language; and executing the control processing layer in accordance with the visual program created in the graphical layer, with execution of the control processing layer including executing one or more functional modules specified by the visual program, with execution of a functional module causing execution of a method of that functional module by executing code using one or more data structures of the method to effect the control flow specified by the visual programming language.

In an aspect 59 according to any one of aspects 41 to 58, a particular functional module represents a controlled application included in a data processing layer, the one or more operations further include: executing a particular method of the particular functional module; and responsive to executing the particular method, launching the controlled application.

In a general aspect 60, a data processing system for debugging an executable control flow graph that specifies control flow among a plurality of functional modules, with the plurality of functional modules being represented by graphical program elements and with the control flow being represented by transitions between the graphical program elements, with each functional module being configured to execute one or more actions on a computer system, the data processing system including one or more processing devices and one or more machine-readable storing one or more instructions that are executable by the one or more processing devices to perform operations including: specifying a position in the executable control flow graph at which execution of the executable control flow graph is to be interrupted; wherein the specified position represents a transition to a given functional module of the plurality of functional modules, a transition to a state in which some of the one or more actions of the given functional module start executing or a transition from the given functional module; starting execution of the executable control flow graph in an execution environment, wherein the execution environment is hosted on one or more computers and is configured to execute the plurality of functional modules; and at a point in time of the execution representing the specified position, interrupting the execution of the executable control flow graph; and providing data representing one or more attributes of the execution environment prevailing at the point in time.

Other features and advantages of the invention will become apparent from the following description, and from the claims.

DESCRIPTION OF DRAWINGS

FIGS. 1A-1G, 2 and 11 are each a diagram of a plan.

FIGS. 5, 6, 9B-9C are each an example of controls in a plan debugger.

DETAILED DESCRIPTION

Figure 1A:
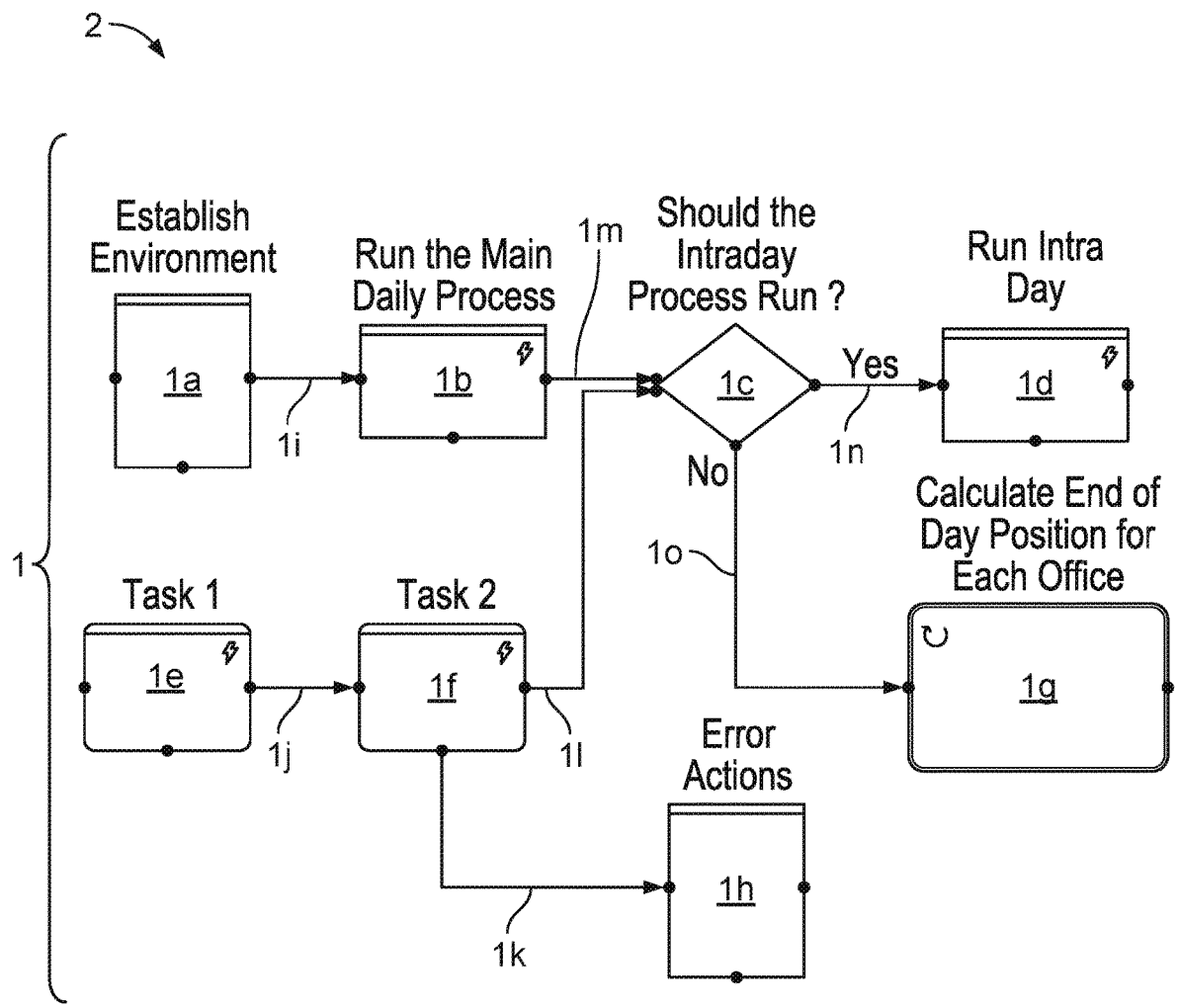

Referring to FIG. 1A, diagram 2 illustrates graphical portion 1 of a plan. For purposes of convenience, and without limitation, the entirety of the plan (that includes graphical portion 1) is hereinafter referred to as plan 1. Generally, a "plan" as used herein (also called herein an "executable control flow graph" or a "graphical control flow application") includes a visual program with graphical program elements each representing a functional module. In turn, each functional module represents a controlled application.

The plan specifies control flow among the functional modules. By specifying the control flow, the plan provides a visual organization of the execution of the various functional modules of the plan. Generally, the control flow specified by the plan is represented by transitions or connections between the graphical program elements in the plan. The plan can be run or executed and encapsulates information through the functional modules for the various controlled applications to be executed.

Generally, a controlled application includes a program that is external to the plan and is run by the plan. Examples of a controlled application include a computer program, a script, a dataflow graph, another plan, and so forth. Generally, a graphical program element includes an element of the visual program in a visual programming language (VPL) that can be manipulated graphically rather than textually. Generally, a functional module includes data structures of the plan, methods of the plan and code for implementing the methods with the data structures. In an example, a type of functional module is a task that includes a series of actions (within the plan, rather than the controlled application) to be executed. For purposes of convenience, a functional module may also be referred to herein as a "task," without limitation. In this example, control flow expresses logic about a sequence of execution of the functional modules of the plan. Generally, a functional module represents conditional logic, a program, a user script, a process, and so forth. A functional module may be implemented using a dataflow graph or may represent another executable control flow graph (called a "subplan" or a sub-executable control flow graph). For example, a subplan is a plan embedded in a larger plan and is used in a plan for organizational convenience and can include various functionality, e.g., looping functionality. The subplan can represent many different tasks, as well as further nested subplans. The plan controls the sequence, relationships, and communication between tasks by how the tasks are connected and how methods and parameters are specified. In the plan, the tasks, the run sequence, the conditional logic, and the relationships between tasks are represented graphically.

In this example, the plan includes a graphical layer (previously referred to as the graphical portion) and a control processing layer, each of which are distinct from a data processing layer (e.g., the controlled application). The graphical layer includes the visuals in the graphical user interface and the visual program in the VPL. The control processing layer includes the tasks, methods, underlying data structures (used in executing the methods), and code that executes the methods using the underlying data structures to effect the control flow specified by the visual programming language.

The plan, subplan and graphical program elements include graphical entities that are part of a visual program, and the tasks and other functional modules of the plan are represented by the graphical entities and are controlled by the visual program called the "executable control flow graph". That is, the executable control flow graph does not specify control flow among graphical icons but controls the execution order of real data processing.

In an example, the executable control flow graph (or plan) includes a directed graph with nodes representing the functional modules, e.g., tasks, subplans, and so forth. The nodes are connected by directed links (also called "transitions" herein) representing control flow among the functional modules. In particular, each of the directed links is specified by data structures specifying control flow among the functional modules. In this example, execution of the plan itself causes execution of the underlying control processing layer represented by the node in the plan in accordance with the control flow specified by the plan. The plan may be run on one or multiple computing nodes (e.g., central processing units (CPUs)), e.g., in a distributed manner such that each graphical program element is run on a different one of the computing nodes, wherein the different computing nodes are communicatively interconnected by network connections.

The construction of an executable control flow graph can be highly technical in nature in some cases. The executable control flow graph may implement graph-based control flow among various subplans and tasks. The executable control flow graph is specified by data structures in a data storage, the executable control flow graph having a plurality of nodes being specified by the data structures and representing the subplans and/or tasks connected by one or more links, the links being specified by the data structures and representing data flows between the nodes. A runtime environment (or execution environment) coupled to the data storage and being hosted on one or more computers may be used, the runtime environment including a pre-execution module configured to read the stored data structures specifying the executable control flow graph and to allocate and configure computing resources such as processes for performing the computation of the tasks and subplans that are assigned to the executable control flow graph by the pre-execution module, the runtime environment including an execution module to schedule and control execution of the assigned processes such that any one of the methods described herein is executed.

There are different types of tasks, including, e.g., a program task (e.g., a task that represents a specified program, which is a process that is distinct from a process running the plan, and/or that enables automatic incorporation of executable code in the plan), a plan task (e.g., a task representing a child plan, which is a process (for execution of another plan) that is distinct from a process running the plan), a graph task (e.g., a task that represents a dataflow graph, which is also a process that is distinct from a process running the plan, and/or is configured to run a separate executable dataflow graph from within the plan), and a conditional task that implements conditional logic in a plan. In this example, each task represents an ordered series of actions to be executed on a computer system.

The main action of a task is called its Perform method. For example, the Perform method may be implemented to perform the main functionality of the task. In addition to the Perform method, each task can optionally execute other actions at specific times or in response to specific conditions—as described in further detail below. The Perform method gives the task its identity. The rest of the task supports the Perform method. Various optional actions prepare for or set-up the execution of the Perform method, report on its outcome, and clean up after it. In some examples, a plan includes an underlying data structure that stores the logic representing the various tasks and subplans and the relationships among these various tasks and subplans.

In this example, execution of the plan causes the underlying data structure to be executed or run, e.g., by instantiating appropriate objects for the various tasks and methods in a plan. For example, the system stores the contents of a plan in a file that includes a hierarchical representation of the plan. The hierarchical representation includes nodes, with each node corresponding to an element (e.g., task, method, or subplan) of the plan. The system instantiates the plan by traversing the nodes in the hierarchical representation. For each node, the system instantiates an object for an element represented by that node. For example, when a node represents a task, the system instantiates a task object for that node. Additionally, when the plan specifies to run a method on that task, the system instantiates a method object for that method.

In the example of FIG. 1A, plan 1 is a plan for processing data records to determine which actions (e.g., running an intraday process or calculating an end of day position) are appropriate for execution, e.g., based on the processing of those data records. In this example, the system executes plan 1 in a financial services setting as part of a procedure for determining intraday trade prices or closing out trading for the day, e.g., by determining whether to run a particular process (i.e., an intraday process) or to perform a particular calculation that determines end of day positions. Plan 1 includes graphical program elements 1$a$, 1$b$, 1$c$, 1$d$, 1$e$, 1$f$, 1$g$, 1$h$ and transitions 1$i$, 1$j$, 1$k$, 1$l$, 1$m$, 1$o$. The graphical program elements 1$a$, 1$b$, 1$c$, 1$d$, 1$e$, 1$f$, 1$g$, 1$h$ represent respective tasks as introduced above and the transitions 1$i$, 1$j$, 1$k$, 1$l$, 1$m$, 1$o$ represent control flow, as introduced above, that is specified by plan 1. For the convenience of the reader, whenever reference signs indicating graphical program elements or transitions are referred to, the respective tasks and control flow, respectively, are directly referred to when describing the corresponding figures. As such, plan 1 includes program tasks 1$a$ and 1$h$, graph tasks 1$b$ and 1$d$, conditional task 1$c$, plan tasks 1$e$ and 1$f$ and subplan 1$g$. Each of program tasks 1$a$ and 1$h$, graph tasks 1$b$ and 1$d$, conditional task 1$c$, and plan tasks 1$e$ and 1$f$ may be referred to herein as a "task," for purposes of convenience.

In this example, task 1$b$ can only execute after task 1$a$ has completed. Task 1$f$ can execute only after task 1$e$ has completed. Plan 1 also shows that a condition specified in conditional task 1$c$ is subsequently evaluated ("Should the intraday process run?"), and if found to be "No", then the end-of-day position is calculated, by the system, for each office by iterating over subplan 1$g$. If "Yes," then the system executes task 1$d$ to perform an intraday run. In this example, various tasks can also be triggered on the failure of other tasks—this is illustrated in plan 1 by the "Error Actions" task (i.e., task 1$h$), which is run if Task 2 (i.e., task 1$f$) fails for any reason.

In this example, each of program tasks 1$a$, 1$h$ points (or otherwise refers) to an external program, or to an external or embedded script. Each of graph tasks 1$b$ and 1$d$ points (or otherwise refers) to an executable dataflow graph (e.g., that is stored in storage). Generally, an executable dataflow graph (also referred to as an executable graph) includes a directed dataflow graph, with vertices in the graph representing components (either data files or processes), and the links or "edges" in the graph indicating flows of data between components. A system for executing such graph-based computations is described in prior U.S. Pat. No. 5,966,072, titled "EXECUTING COMPUTATIONS EXPRESSED AS GRAPHS," incorporated herein by reference.

The construction of a dataflow graph can be highly technical in nature in some cases. The data flow graph may implement a graph-based computation performed on data flowing from one or more input data sets through a graph of processing graph components to one or more output data sets, wherein the data flow graph is specified by data structures in a data storage, the dataflow graph having a plurality of nodes being specified by the data structures and representing the graph components connected by one or more links, the links being specified by the data structures and representing data flows between the graph components. A runtime environment (or execution environment) coupled to the data storage and being hosted on one or more computers may be used, the runtime environment including a pre-execution module configured to read the stored data structures specifying the data flow graph and to allocate and configure computing resources such as processes for performing the computation of the graph components that are assigned to the data flow graph by the pre-execution module, the runtime environment including an execution module to schedule and control execution of the assigned processes such that any one of the methods described herein is executed.

While written to achieve specific business ends, the underlying structure and construction of the graph is determined based upon technical considerations. For example, graph components may be selected to maximize reusability, or to support parallel processing. On the other hand, how and where a graph is used may be largely a business decision. Some of the parameters associated with a parameterized dataflow graph can be used to enable business users to customize dataflow graphs without requiring the user to understand the technical complexities behind its implementation. The parameterized dataflow graphs simplify customization and facilitate reuse.

Each of plan tasks $1e$, $1f$ points to a plan located in an external file. Conditional task $1c$ implements decision logic in plan 1—based on a specified expression or program. Subplan $1g$ groups tasks (included in subplan $1g$) as part of a plan, and allows these tasks to be run iteratively. Plan 1 also includes transitions $1i$-$1o$ that indicate a dependency among tasks, e.g., and thus control an execution order among tasks. That is, transitions $1i$-$1o$ represent connections among these tasks and thus specifies an execution dependency.

A task provides a framework for executing methods, e.g., by the task specifying which controlled applications are to be executed and encapsulating information about the controlled applications (e.g., location, arguments, etc.). The programming code for the controlled applications can be stored in storage and referred to by the task. These methods perform the actions of the task. That is, the plan is not a visualization of an underlying code source. Rather, the plan itself is a visual program that can be run or executed and that also encapsulates information for or representing the various executables to be executed. A plan also includes attributes (e.g., parameters) for the passing of values among tasks. In an example, a change in parameters can affect subplans, methods and other tasks at the same (or different) hierarchical level of the task for which the parameter values are changed. A plan also has specified relationships that govern the order in which the tasks are run. The plan controls the sequence, relationships and communications among the tasks, in accordance with connections among the tasks and specification of the methods and parameters.

Figure 1B:
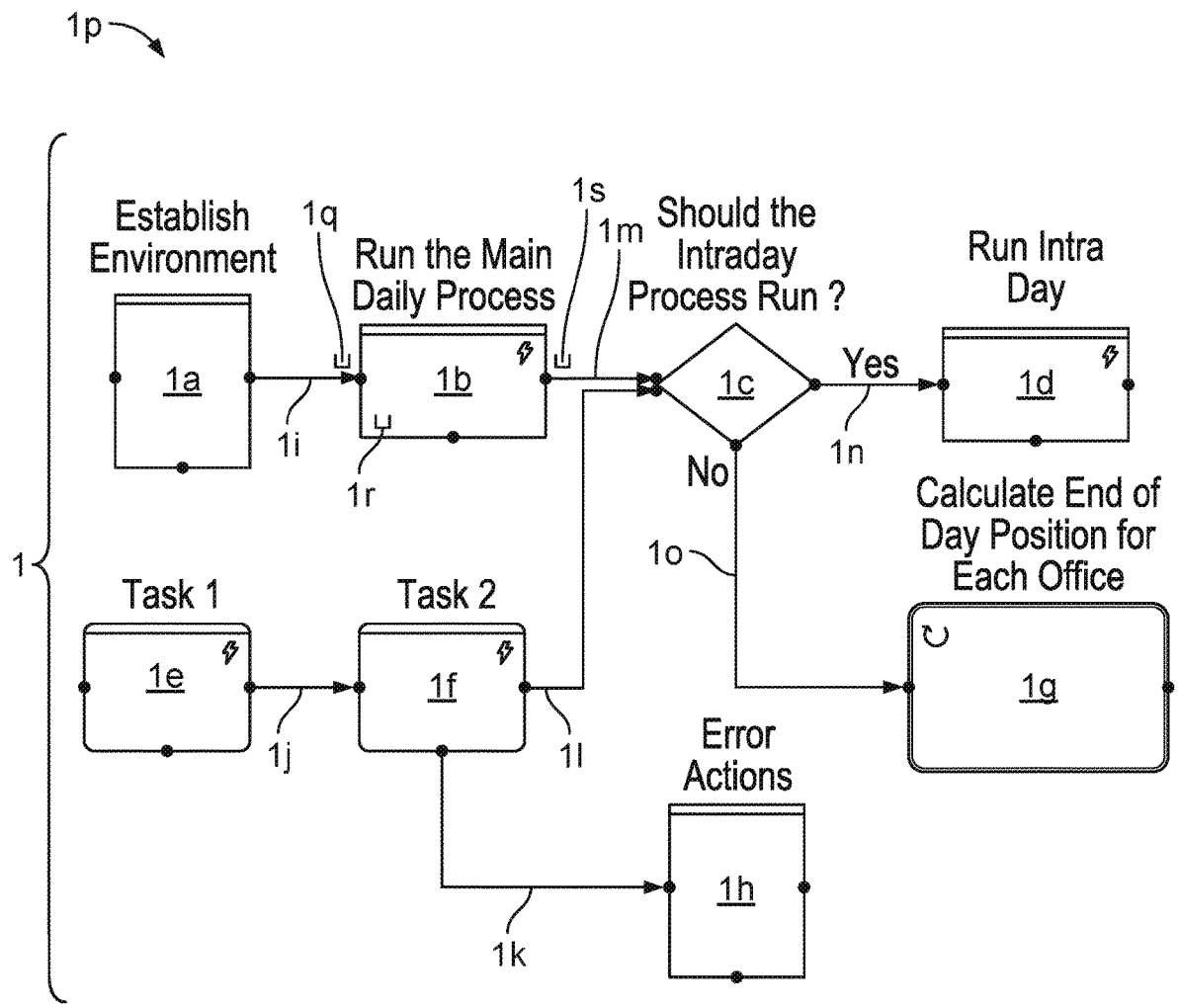

Referring to FIG. 1B, diagram $1p$ illustrates that there are various locations at which a breakpoint may be inserted into the plan 1. Generally, a breakpoint includes an instruction (e.g., an indication, directive, or specification) to pause or stop an execution of the plan in an execution environment. When the executing plan encounters a breakpoint, the plan pauses to enable evaluation (e.g., automatic evaluation or user evaluation) of internal attributes of the plan (e.g., such as operational parameters and associated values of the plan, dynamic parameters that the plan is using and associated values, and if the breakpoint is before a graph or plan is launched, the input values that are going to be sent to that graph or plan) and/or evaluation of attributes that are external to the plan (such as attributes of the execution environment or system that is executing the plan and/or external states and resources (e.g., states of databases and repositories used by the execution environment when executing the plan)). These breakpoints enable monitoring of the attributes, and thereby of the internal states of the underlying system (e.g., plan and/or execution environment), that are prevailing at the time when the executing plan encounters the breakpoint. For example, a user is enabled to view the parameter values used for a task and also to change the functionality of that task (and other tasks that are downstream or dependent on that task), e.g., by changing the values of the parameters. Alternatively or in addition, the user is enabled to view aspects that are external to the plan, such as values of operational parameters of the execution environment indicating a performance (e.g., CPU usage, usage of primary memory, available or occupied data storage capacity, consumed or available network bandwidth, etc.) of the execution environment during the execution of the plan before the plan encountered the breakpoint.

In this example, a breakpoint may be inserted at position $1q$ that represents a transition to a given functional module, namely, task $1b$. A breakpoint may also be inserted at position $1r$ in task $1b$. The setting of a breakpoint at position $1r$ interrupts execution of task $1b$ just before task $1b$ prepares to spawn the represented process (or task) that runs a program or before other functionality or actions. Generally, the setting of or insertion of a breakpoint by the system described herein refers to the recording of a breakpoint by the system. That is, position $1r$ represents a time just before or at which the execution of task $1b$ or some of its actions starts. A breakpoint may also be inserted at position $1s$ that represents a transition from task $1b$ (e.g., position $1s$ represents a time after the execution of the task $1b$ completed).

Figure 1C:
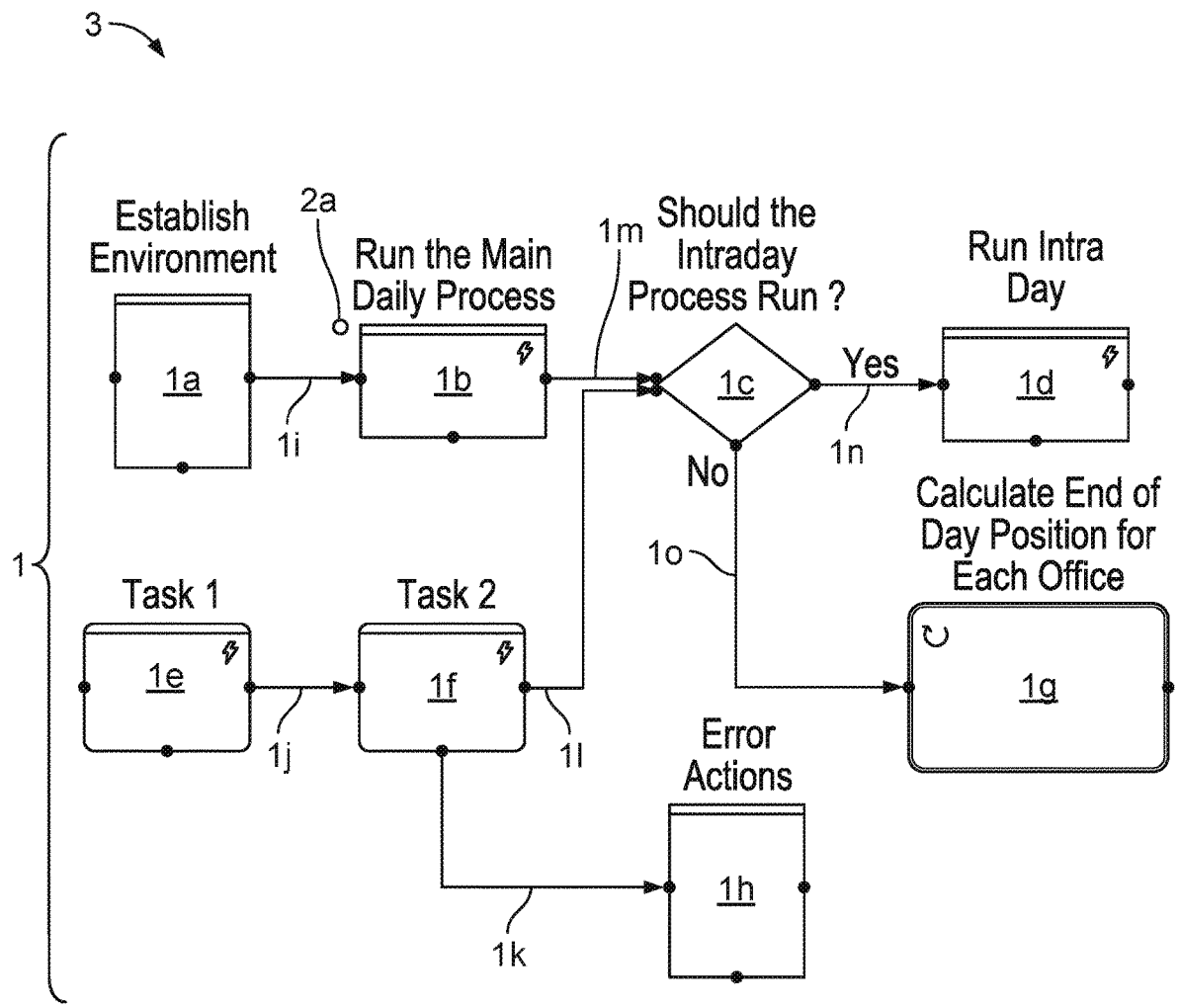

Referring to FIG. 1C, diagram 3 includes breakpoint indicator $2a$ that illustrates that a breakpoint is recorded for task $1b$ in plan 1. Breakpoint indicator $2a$ specifies that one or more breakpoints have been recorded on task $1b$ (i.e., the breakpoints are associated with task $1b$), but does not specify a position of the breakpoint as being before, in or after task $1b$. In this example, the details of where the one or more breakpoints are set are available "on demand," e.g., by selecting or hovering on breakpoint indicator $2a$. Generally, a breakpoint indicator is an indication of or a visual representation of the presence of one or more breakpoints. In this example, execution of plan 1 pauses when the system executes the breakpoint represented by breakpoint indicator $2a$ and an inspector user interface (e.g., referred to as a "Breakpoint Inspector") is presented. The Breakpoint Inspector is presented whenever plan execution is paused (e.g., either by break-on-failure mode, described below, being on and a failure occurring, or by a breakpoint that was set by the user being encountered during the course of plan execution).

Figure 1D:
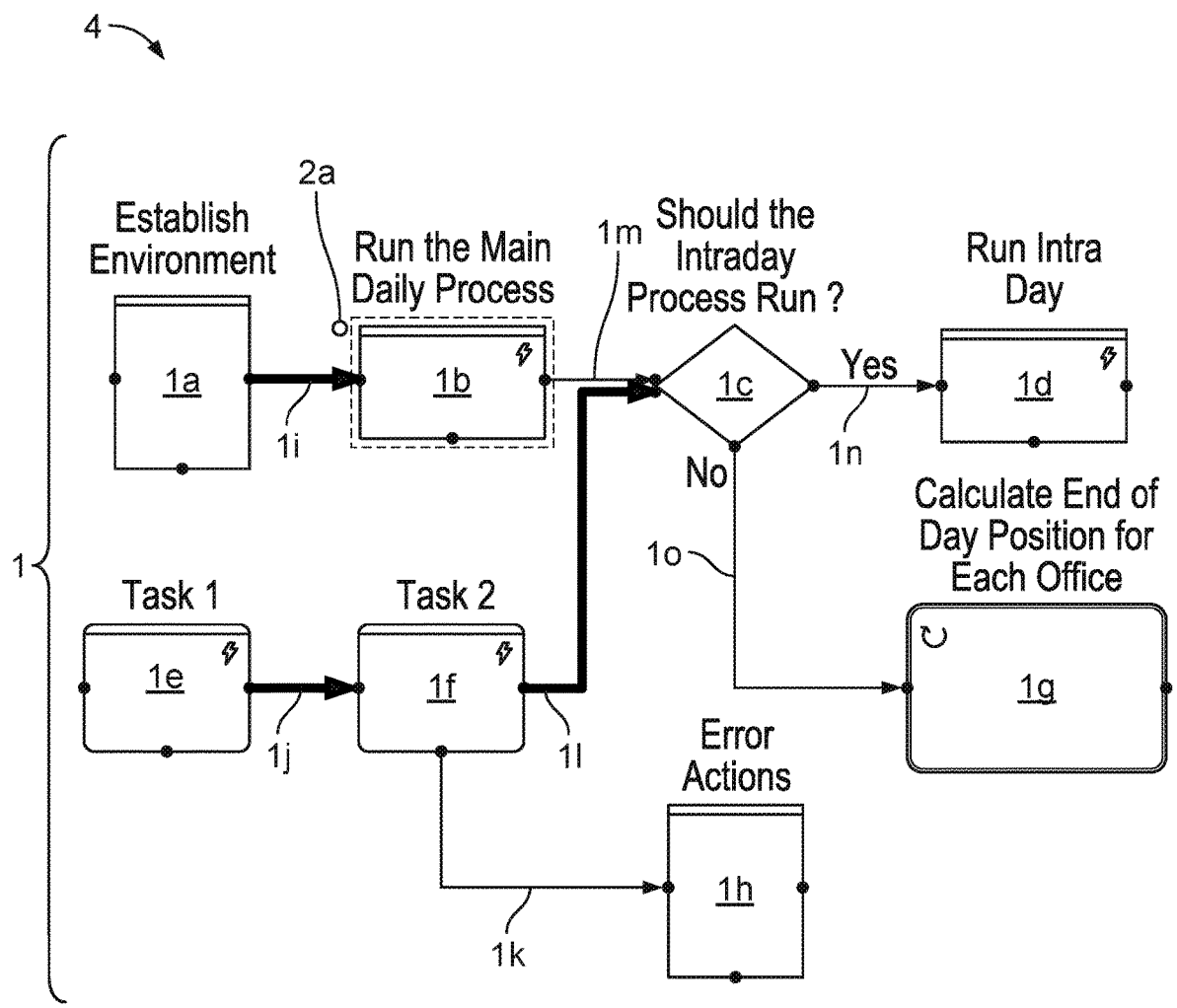

Referring to FIG. 1D, diagram 4 illustrates that plan 1 has encountered the breakpoint represented by breakpoint indicator $2a$, as indicated by the dotted line around task $1b$. That is, task $1b$ is stopped due to the breakpoint represented by breakpoint indicator $2a$ being reached, but the rest of plan 1 continues to run. In this example, arrows $1i$, $1j$, $1l$ are shown as thicker lines (e.g., relative to a thickness of the other arrows shown in FIG. 1D) to represent that plan 1 executed tasks 1a, 1e, 1f. In this example, tasks 1a, 1e, 1f execute (e.g., in parallel or with task 1a executing in parallel with tasks 1e and 1f, which execute in serial order) and plan 1 progresses as far as it can given that plan execution pauses at task 1b. Because the breakpoint represented by breakpoint indicator 2a was recorded for plan 1, a graphical user interface (e.g., the Breakpoint Inspector) is displayed for a user to inspect attributes of task 1b prior to executing task 1b, as described below with reference to FIG. 1E. The display of the graphical user interface may be triggered or initiated in response to plan 1 encountering breakpoint indicator 2a. The graphical user interface may be displayed while the rest of plan 1, e.g. tasks 1e and 1f, continues to run. In this example, task 1c will not run until task 1b completes and succeeds, and task 1b will not complete while execution is stopped at the breakpoint represented by breakpoint indicator 2a.

Referring to FIG. 1E, graphical user interface 5c is displayed, e.g., when a point of execution (of plan 1 in FIG. 1D or of the underlying data structure representing plan 1) representing the specified position of the breakpoint represented by breakpoint indicator 2a (FIG. 1D) is reached. In this example, graphical user interface 5c displays the reason for the execution pause in the title, namely, "breakpoint" after the name of the task (i.e., "Run the Main Daily Process"). Graphical user interface 5c also includes data source portion 4a that specifies a data source for task 1b (FIG. 1D) in plan 1. In this example, the data source has failed to resolve correctly, e.g., as it has resolved as "/inputsrc#dat." Through input portion 4a, a correct data source path can be specified. The data source is used herein as an example of a parameter used by the task, represented by the graphical program element 1b, during execution of the task and the data source path is an example of the value of such a parameter that can be modified or corrected by a user through the input portion 4a of the graphical user interface. Referring to FIG. 1F, graphical user interface 5d is a version of graphical user interface 5c after a correct data source has been entered into portion 5a (or portion 4a in FIG. 1E). In this example, upon the input of new information (e.g., the modified parameter value) into portion 5a, graphical user interface 5d displays continue control 5b, selection of which causes task 1b (FIG. 1D) to continue execution and, optionally, each of graphical user interfaces 5c, 5d to stop being displayed. This is an example of how changes are made to tasks while a plan continues to run. In this example, continue control 5b is selected. In a variation, when a task has failed, a graphical user interface is displayed to enable modification of various values (e.g., of parameters used by the task during its execution) and/or inputs used by the task. Upon modification, the graphical user interface displays a control to restart that failed task, e.g., while the rest of the plan still continues to run.

In still another variation, after a task has failed, a user may set a breakpoint (e.g., the breakpoint represented by breakpoint indicator 2a) at the start of task 1b. After doing so, the user executes a command, e.g., the "plan-admin restart <task>" command, in a command line to restart task 1b. Then, when task 1b pauses at the start, the value of the DATA SOURCE parameter can be changed, as described above, so that when task 1b restarts, it will use the corrected value. In this example, the new value is only in effect for that run of plan 1. To permanently change the value of the parameter, the plan itself is edited.

Figure 1G:
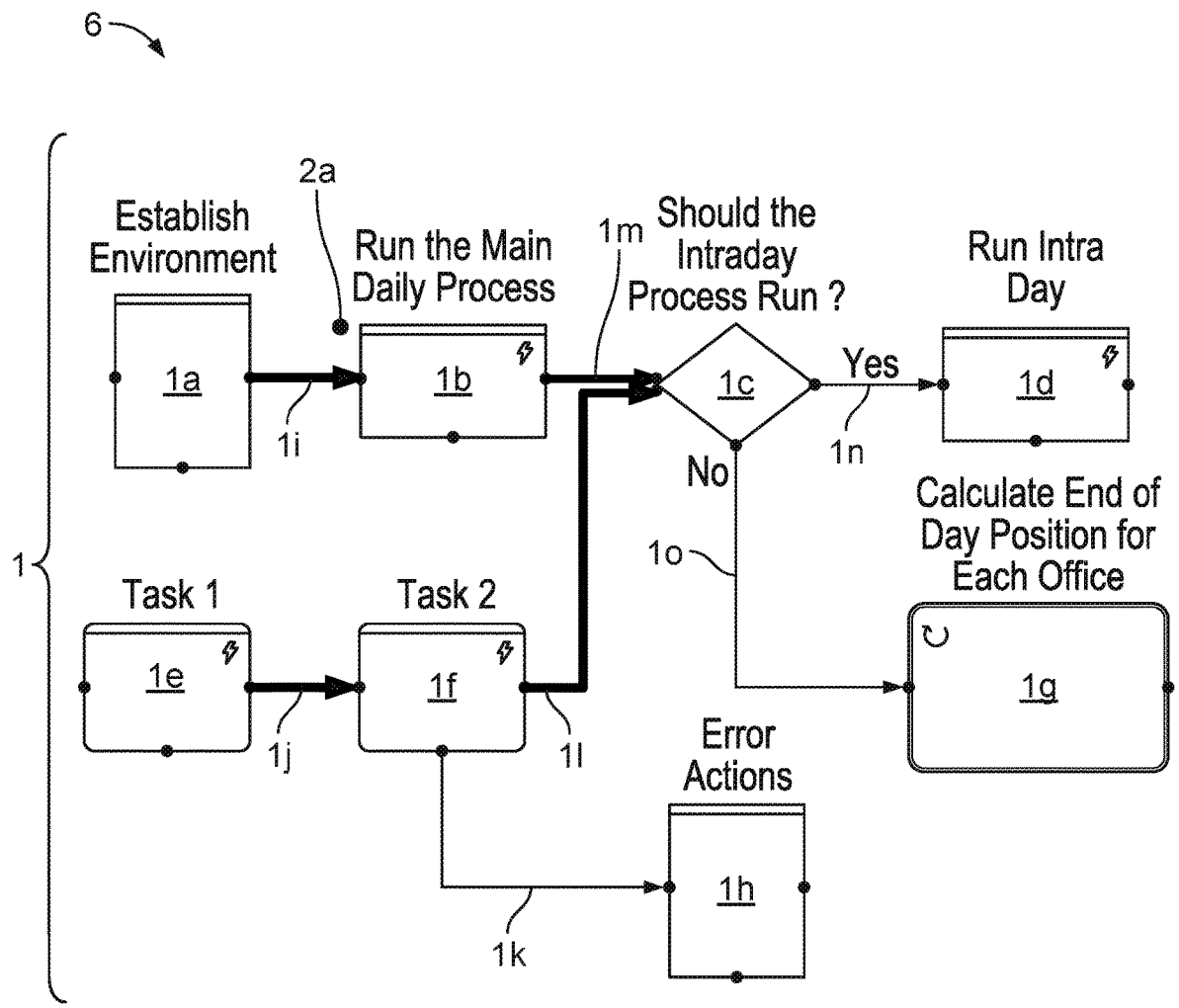

Referring to FIG. 1G, diagram 6 shows re-execution of task 1b (e.g., following selection of continue control 5b in FIG. 1F or following execution of the command (e.g., the "plan-admin restart <task>" command, described above). In this example, task 1b uses the correct value of the DATA SOURCE parameter (based on task 1b pausing at the start due to the breakpoint represented by breakpoint indicator 2a and the value of the DATA SOURCE parameter being changed to the corrected value). As such, plan 1 progresses through tasks 1b to conditional task 1c, as shown by the thickness of arrows 1m, 1l.

Figure 2:
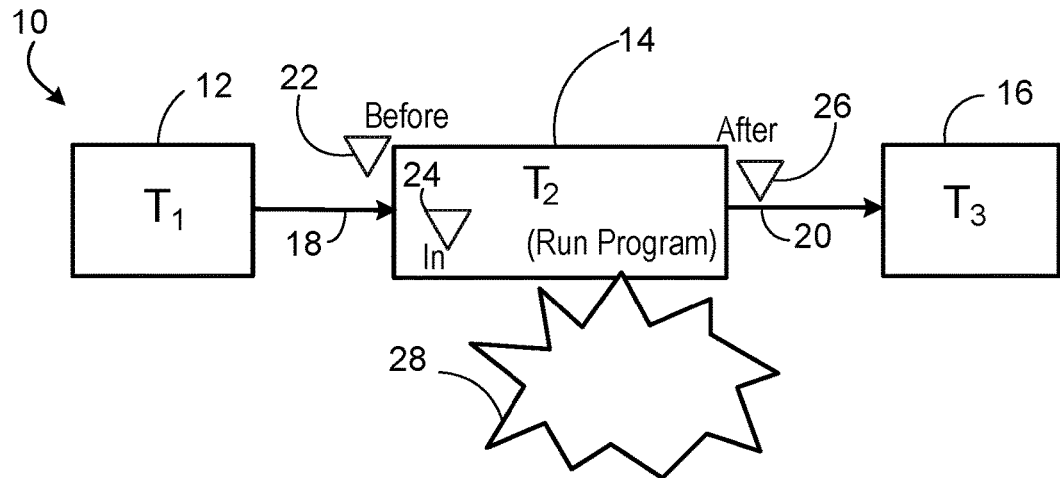

Referring to FIG. 2, control flow diagram 10 (also referred to as plan 10) includes graphical program elements 12, 14, 16 and transitions 18, 20. The graphical program elements represent respective tasks 12, 14, 16. The transitions 18, 20 represent the control flow specified by the plan 10. For the convenience of the reader, whenever reference signs indicating graphical program elements or transitions are referred to, the respective tasks and control flow, respectively, are directly referred to when describing the corresponding figures. That is, graphical program elements 12, 14, 16 are referred to as tasks 12, 14, 16, respectively, and transitions 18, 20 are referred to as connections 18, 20, respectively. In this example, plan 10 includes connections 18, 20 that specify that task 12 is executed first, followed by execution of task 14 and then task 16. In this example, behavior of plan 10 can be modified to include one or more breakpoints that cause plan 10 to stop or pause execution, thereby allowing for review and/or modification of the plan, tasks, subplans and/or parameters.

This plan debugging functionality provides flexibility on where breakpoints are set, e.g., by enabling the setting of breakpoints at various hierarchical levels. For example, the system can set a breakpoint at the level of the entire plan, at the level of the subplan, at the level of the task, or even at the level of a method of a task. Additionally, a breakpoint can be set at the following three positions: before the plan, subplan, task or method; in the plan, subplan, task or method, and after the plan, subplan, task or method, each of which are described in further detail below.

In this example, a breakpoint can be recorded at position 22 before task 14. A breakpoint at position 22 stops execution of task 14 before it starts. For program, plan and graph tasks, this stopping of the execution occurs before resources (e.g., a constrained element, such as, a specified number of available tokens) are acquired. For graph tasks, this stopping of the execution also occurs before the graph is compiled for execution. A breakpoint can be recorded at position 24 in task 14. In this example, task 14 is configured to run computer program 28. As such, the breakpoint at position 24 interrupts execution of task 14 before task 14 executes its Perform method. The breakpoint at position 24 provides for modification of environment variables of plan 10 and viewing and editing of input values (e.g., expressions for input parameters) to be used in program 28. A breakpoint can be recorded at position 26 after task 14 to stop the execution of task 14 after it finishes.

In this example, the places where breakpoints can occur are very efficient places for checking whether breakpoints have been requested. As such, there is no (or only minimal) measurable increase in consumption of computing resources, such as CPU consumption, due to the checking for breakpoints. This is because the programming code that is used in the plan to check for breakpoints is minimal and thus not computationally expensive. In an example, the program is configured to check a hash table for an occurrence of a breakpoint each time the program progresses to a location in which a breakpoint could be inserted (e.g., at each location representing before, in or after a plan, subplan, task or method). In an example, a first plan ("plan A") includes a breakpoint before a first task ("task A"). In this example, the hash table includes the following entry "/planA/taskA/before" to indicate that there is a breakpoint before task A, which is included in plan A. As such, when the system executes the portion of the program that corresponds to a location before execution of task A, the system performs a look-up (e.g., a string look-up) to identify if there is an entry representing that location before the execution of task A. In this example, that entry is populated with the string "/planA/taskA/before." As such, the system executes a breakpoint before task A. In another example, the hash table is empty. In this example, the system does not check for entries specifying breakpoints.

Figure 3:
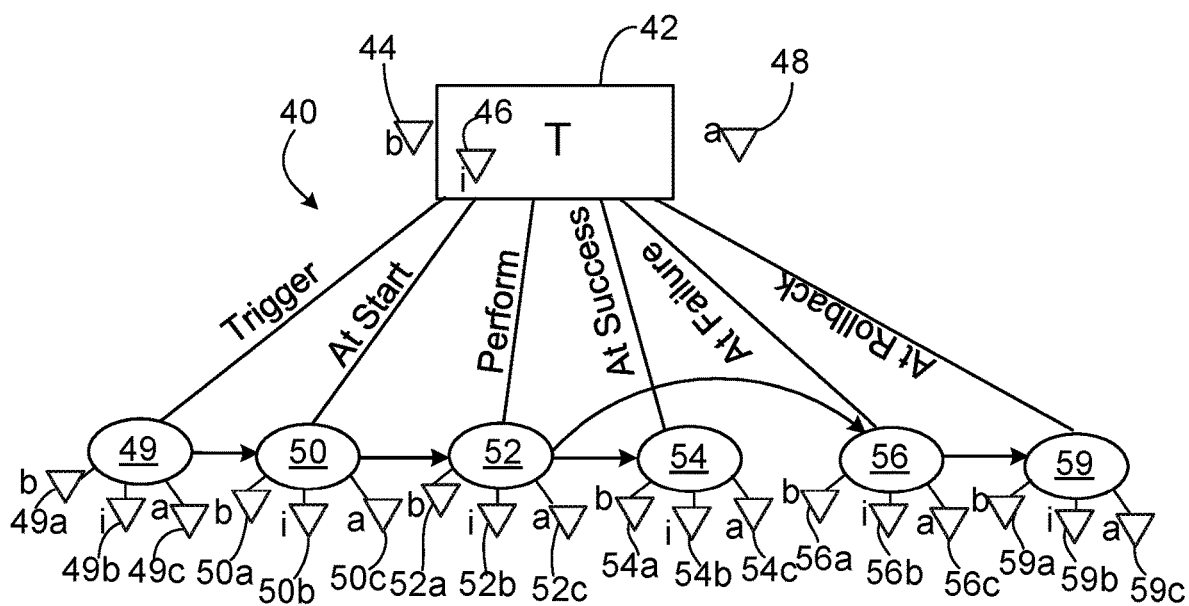
FIG. 3 is a diagram of a task, its methods and insertion of breakpoints relative to the task and its methods.

Referring to FIG. 3, diagram 40 displays graphical program element 42 representing a task. For the convenience of the reader, whenever reference signs indicating graphical program elements are referred to, the respective tasks are directly referred to when describing this figure. As such, graphical program element 42 is also referred to as task 42. In this example, a breakpoint can be recorded at position 44 before task 42, another breakpoint can be recorded at position 46 in task 42 and yet another breakpoint can be recorded at position 48 after task 42, as previously described. In this example, task 42 includes or references a script and further includes several methods (each method including one or more actions as previously described) that can be executed on a computer system (e.g., in an operating system of the system described herein). These methods are existing methods provided by the system described herein. In this example, task 42 is configured with "Trigger" method 49, "At Start" method 50, "Perform" method 52, "At Success" method 54, "At Failure" method 56, and "At Rollback" method 59, each of which executes one or more actions of task 42 or represents one or more states of task 42. In this example, Trigger method 49 may be implemented to represent the starting point of the task 42. It may include the condition for starting the execution. There may be various conditions, including, e.g., whether a specific file exists, whether a flag has been set to true, and so forth. At Start method 50 sets-up execution to perform the actions of task 42. For example, At Start method 50 may be implemented as a method that prepares the system for the Perform method, such as setting environmental variables to desired values, or setting up log files to log runtime information. Perform method 52 performs specified actions of the task, e.g., by running the executable represented by task 42. For example, Perform method 52 may be implemented to perform the main functionality of task 42. If Perform method 52 succeeds during its execution, At Success method 54 is executed to exit task 42. If Perform method 52 fails during its execution, At Failure method 56 is executed to exit task 42. In this example, At Rollback method 59 is executed after At Failure method 56. In this example, the methods before and after the Perform method are referred to as "framework methods." The framework methods before the Perform method set up the environment (and/or situation) for the controlled application to run, but are not part of the controlled application. The framework methods after the Perform method (i.e., the At Failure, At Success and At Rollback methods) are also part of the plan and execute based on the result of the run of the controlled application. The framework methods are not performing the actions of the controlled application. These framework methods are part of the plan's control processing layer.

In this example, breakpoints can be set before, in and after Trigger method 49, as specified by breakpoints 49a, 49b, 49c. In this example, breakpoints can be set before, in and after At Start method 50, as specified by positions 50a, 50b, 50c, respectively. In this example, a breakpoint at position 50a specifies that execution of task 42 is paused or interrupted before At Start method 50 starts. A breakpoint at position 50b specifies that execution of task 42 is paused or interrupted at the start of At Start method 50. A breakpoint at position 50c specifies that execution of task 42 is paused or interrupted at the completion of At Start method 50. Breakpoints can be recorded before, in and after Perform method 52, as specified by positions 52a, 52b, 52c. In this example, the recording of a breakpoint at position 46 in task 42 is the same as recording a breakpoint in position 52a before execution of Perform method 52.

Additionally, breakpoints can be recorded at positions 54a, 54b, 54c for At Success method 54 to interrupt the At Success method 54 before it performs the actions of the At Success method 54, while it is performing the actions of the At Success method 54, and after it performs the actions of the At Success method 54, respectively. In an example, breakpoints can be recorded at positions 56a, 56b, 56c—before, in or after (respectively) At Failure method 56. For example, a breakpoint can be recorded at position 56a for At Failure method 56 to determine a setup of attributes of task 42 before At Failure method 56 runs. In this example, At Rollback method 59 rolls back failed tasks, e.g., by rolling back what has been done in reverse execution order starting at the point of failure. For example, the system described herein may store a recovery file for a graph or a plan. The system uses that recovery file (along with the At Rollback methods) to clean up as necessary. In an example, breakpoints can be recorded at positions 59a, 59b, 59c representing before, in or after (respectively) At Rollback method 59. A breakpoint at position 59a specifies that execution of ask 42 is paused or interrupted before At Rollback method 59 starts. A breakpoint at position 59b specifies that execution of task 42 is paused or interrupted at the start of At Rollback method 59. A breakpoint at position 59c specifies that execution of task 42 is paused or interrupted at the completion of At Rollback method 59. In a variation, the At Success, At Failure and At Rollback methods are optional. As such, when those methods are not included in a task, then no breakpoints would be able to be set for those methods.

In addition to or rather than setting breakpoints, a plan can also be run in break-on-failure mode, which causes execution of the plan to be interrupted when the plan encounters a failure. For example, if a Perform method for a graph, plan, or program task fails because the graph, child plan, or program that it ran failed, then the execution of the plan will pause after the Perform method finishes. When a plan is running in break-on-failure mode and a failure is encountered, the Breakpoint Inspector is displayed to enable a user to view a cause of the failure and attributes of the functional module for which the failure occurred.

In some examples, a user can set break-on-failure, wait for a task to fail (at the perform method's after breakpoint), diagnose the problem, fix the problem, then rerun the plan to avoid the failure. In this example, the system can execute a command to restart a task, e.g., any point of a task's lifetime. That is, even if the task is stopped at its "before" breakpoint, the command can still be issued successfully. Then, when the task has finally failed and finished, it will restart automatically, as follows:

The system executes a plan in the break-on-failure mode (or sets a breakpoint after the Perform method). In cases where the breakpoint has been set, the system waits for the breakpoint to be encountered during plan execution. After the plan's execution pauses, a user or the system examines the state to diagnose the reason for the failure. Following diagnosis, the user sets (or the system records) a "before" breakpoint on the task or Perform method. The user or the system issues a command to restart the task and the system waits for the "before" breakpoint to be encountered (when the task is automatically restarted). The user or the system corrects the cause of the failure (e.g., by overriding a parameter value, changing a file, and so forth) and continues on from the "before" breakpoint so that the task will succeed.

Unlike a breakpoint that specifies a particular position (e.g., before, in or after) with regard to a particular plan element (e.g., a plan, subplan, task or method) at which to pause execution, break-on-failure mode does not specify this type of particular plan element and position. Rather, break-on-failure mode is a mode in which to execute a plan (and cause execution to pause upon failure) and does not specify a particular plan element. Instead, execution will automatically pause at a failed task. In some examples, break-on-failure mode always causes execution to pause at the after position of the Perform method of the failed task.

Figure 4:
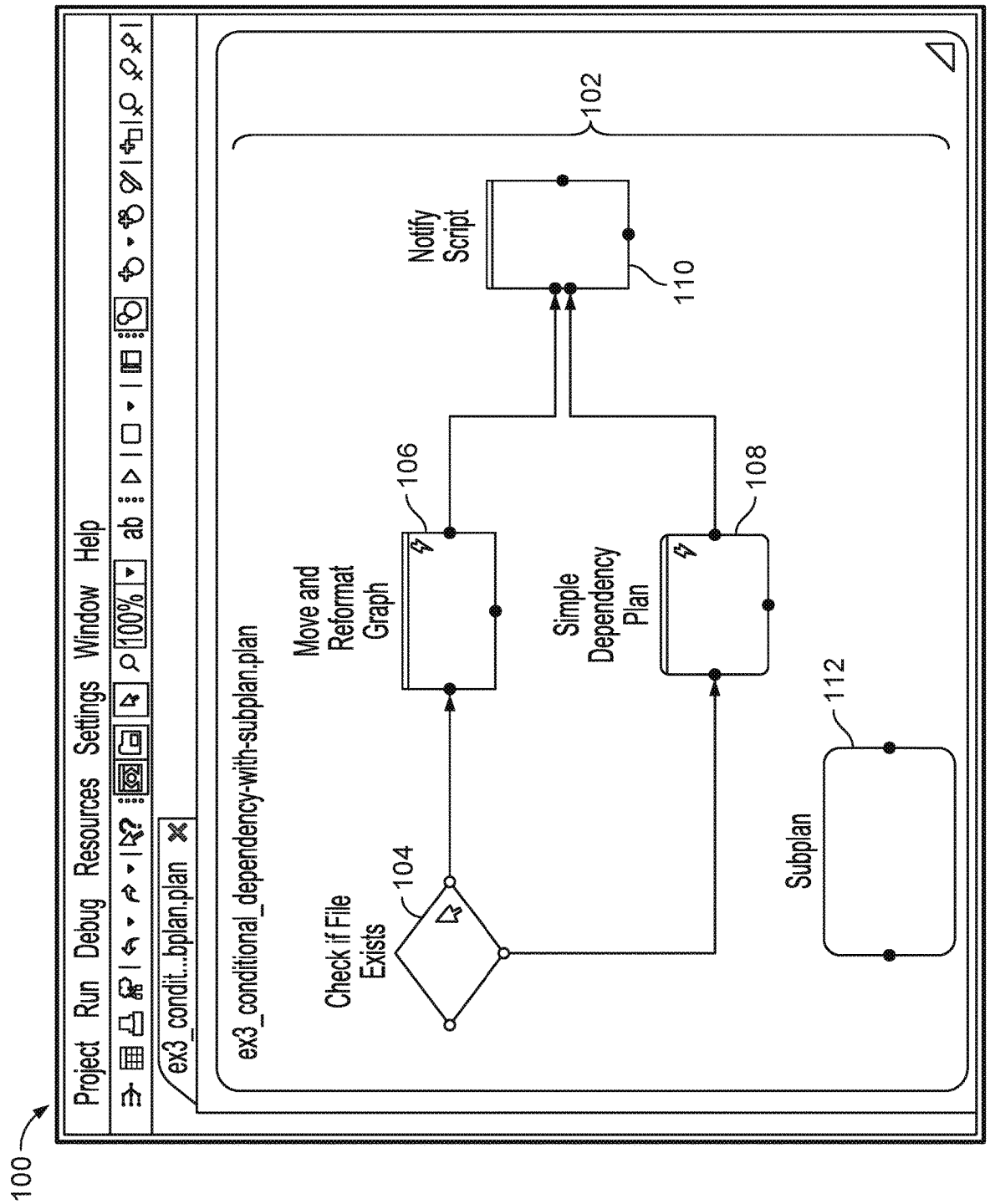
FIGS. 4, 7A and 7B are each an example of a user interface of a various aspects of a plan defined in a graphical development environment.

Referring to FIG. 4, graphical user interface 100 displays graphical layer 102 of a plan (collectively referred to herein as "plan 102," for purposes of convenience and without limitation), which includes graphical program elements 104, 106, 108, 110 representing respective tasks and also graphical program element 112 representing a subplan. For the convenience of the reader, whenever reference signs indicating graphical program elements are referred to, the respective tasks and subplan are directly referred to when describing the following FIGS. 5-7. As such, graphical program elements 104, 106, 108, 110 are referred to herein as tasks 104, 106, 108, 110, respectively, and graphical program element 112 is referred to herein as subplan 112.

In this example, task 106 is a Move and Reformat Graph task (hereinafter also referred to as "Move and Reformat Graph task 106"). Move and Reformat Graph task 106 is a functional module that includes or references an executable dataflow graph (e.g., a Move and Reformat Graph). The executed dataflow graph is part of the data processing layer, whereas Move and Reformat Graph task 106 is part of the graphical layer and encapsulates information about how to execute the dataflow graph. In this example, task 108 is a child plan, hereinafter also referred to as "Simple Dependency Plan 108." Generally, a child plan is a plan that is executed as a new process (i.e., a "child process") that is distinct from a process that is running the plan that executes the child plan. The dataflow graph (e.g., the Move and Reformat Graph) is executed in a different process than the process running the plan.

Additionally, in this example, task 104 is a conditional task, including, e.g., a task that is configured to perform one or more first actions (e.g., by executing one or more methods) upon satisfaction of a condition and to perform one or more second actions (e.g., by executing one or more other methods) upon failure of satisfaction of the condition. In an example, every task can be configured as a conditional task. Additionally, a conditional task may specify conditions other than success or failure—such, e.g., a specific value. In this example, task 104 checks whether a file exists. Task 104 is also hereinafter referred to as "Check if File Exists Task 104." Check if File Exists Task 104 is an implementation of conditional logic, directing the control to either Move and Reformat Graph 106, or Simple Dependency Plan 108 depending on whether a particular file exits. Subplan 112 is itself a control flow diagram and executes in the same process that is running plan 102.

Figure 5:
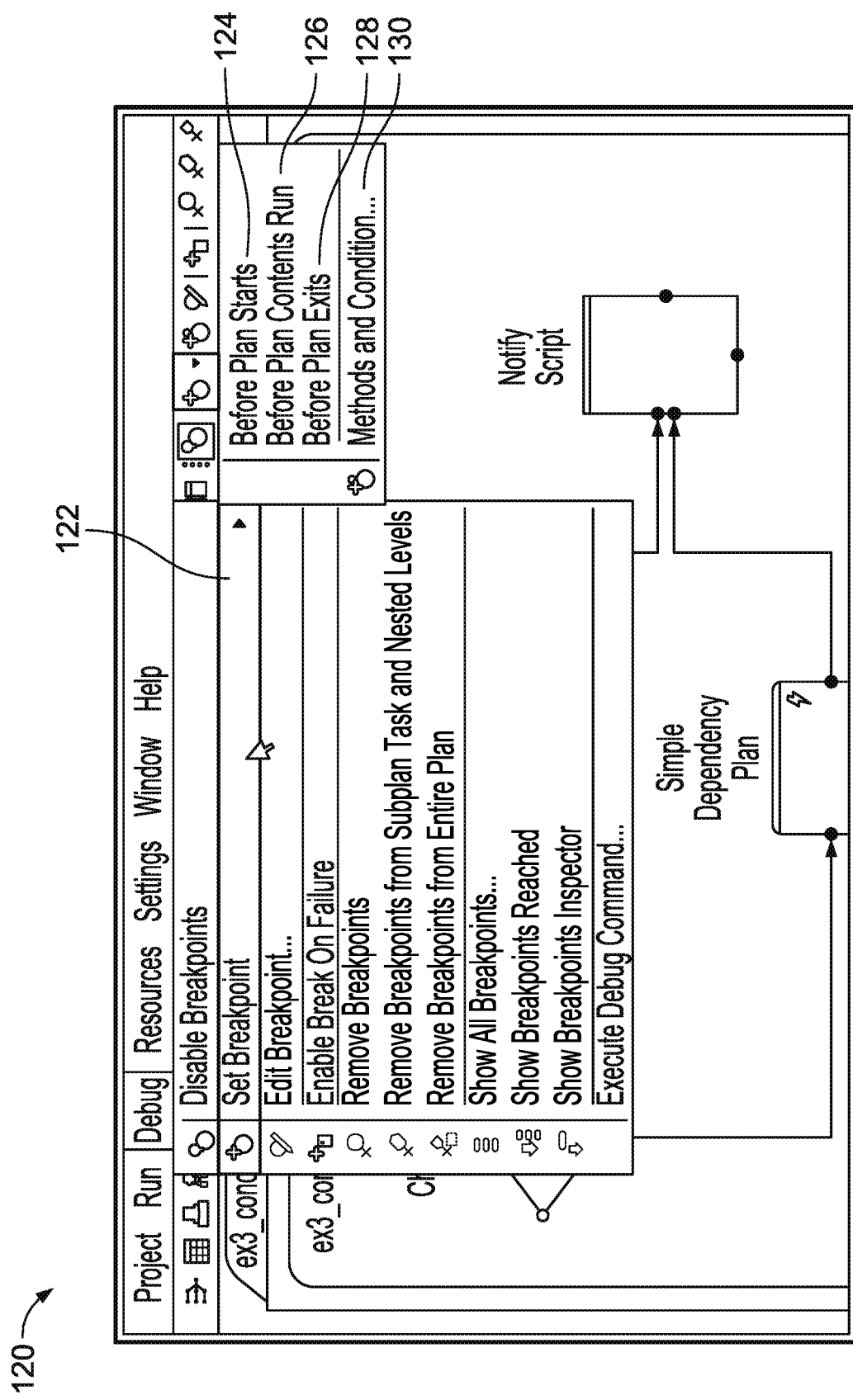

Referring to FIG. 5, graphical user interface 120 includes controls 122, 124, 126, 128, 130 for setting a breakpoint. In this example, control 122 enables a user to set a breakpoint (generally for a plan) and control 124 enables a user to set the breakpoint before a plan starts. Control 126 enables a user to set the breakpoint in the plan and before the plan contents run. Control 128 enables a user to set the breakpoint before the plan exits. Control 130 enables the user to set a breakpoint for various methods and conditions.

Figure 6:
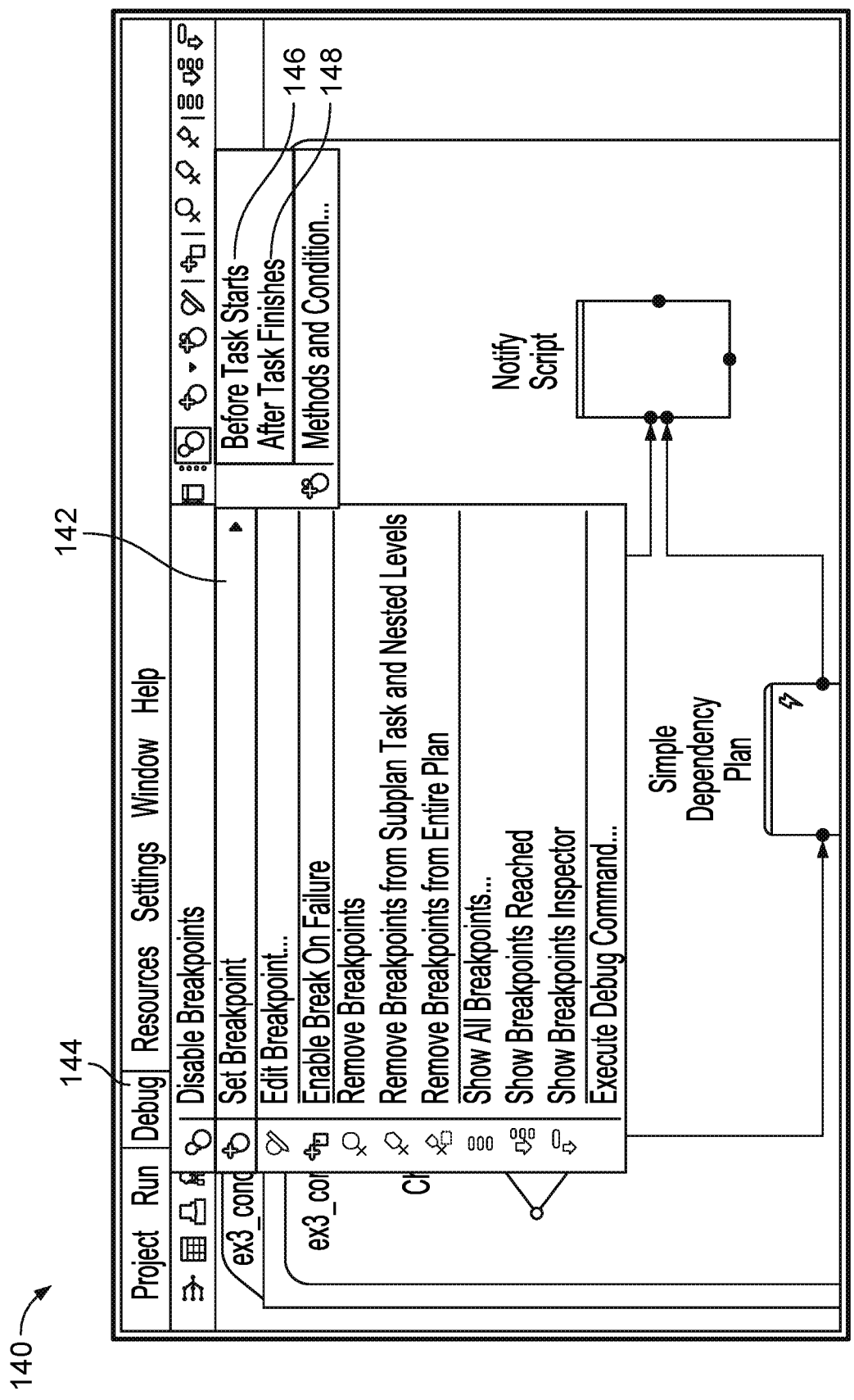

Referring to FIG. 6, graphical user interface 140 provides controls for setting a breakpoint on a task. In this example, a user selects Check if File Exists task 104 (FIG. 4) and selects the "Set Breakpoint" option 142 from debug menu 144. Following this selection, graphical user interface 140 displays controls 146, 148 to enable setting of a breakpoint before task 104 starts or after task 104 finishes, respectively. In this example, the user selects control 146 to set the breakpoint before task 104 starts.

Figure 7A:
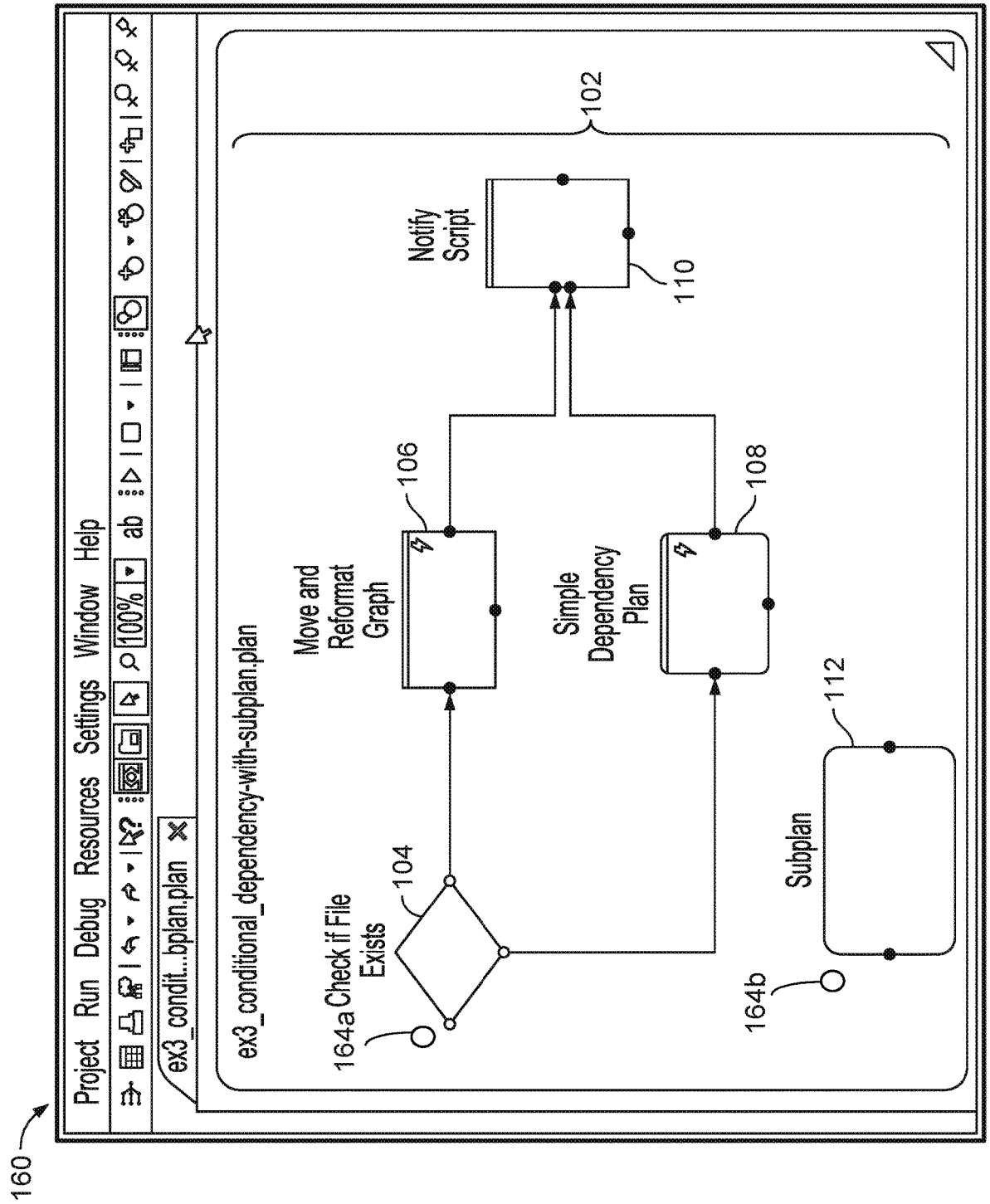

Referring to FIG. 7A, graphical user interface 160 displays plan 102, in which a breakpoint has been recorded (as indicated by breakpoint indicator 164a) on task 104. In this example, breakpoint indicator 164a specifies that one or more breakpoints has been set on task 104, but does not specify a position of the breakpoint as being before, in or after task 104. Additionally, a breakpoint has been recorded (as indicated by breakpoint indicator 164b) on subplan 112, e.g., by selecting subplan 112 and then selecting the "Set Breakpoint" option 142 (in FIG. 6), which enables a user to specify whether to set a breakpoint before subplan 112 starts or after subplan 112 finishes. In this example, a breakpoint is set on subplan 112 before subplan 112 starts. More than one breakpoint can be encountered at the same time, e.g., causing execution of plan to be paused in different places of the plan simultaneously. In this example, the breakpoints represented by breakpoint indicators 164a, 164b can be encountered at the same time. In an example, once breakpoints have been set, the debug menu may provide a "Show All Breakpoints" control, selection of which displays a breakpoint editor dialog with a list of the breakpoints that have been set in the plan. Through this breakpoint editor dialog, a user can add, remove, edit and work with the set of breakpoints that have been defined. Once one or more of the breakpoints represented by breakpoint indicators 164a, 164b is reached, graphical user interface 160 is updated to present an overlay or interface (referred to as "breakpoint reached" pane) that lists the locations of plan 102 that are now paused due to execution of the various breakpoints.

Figure 7B:
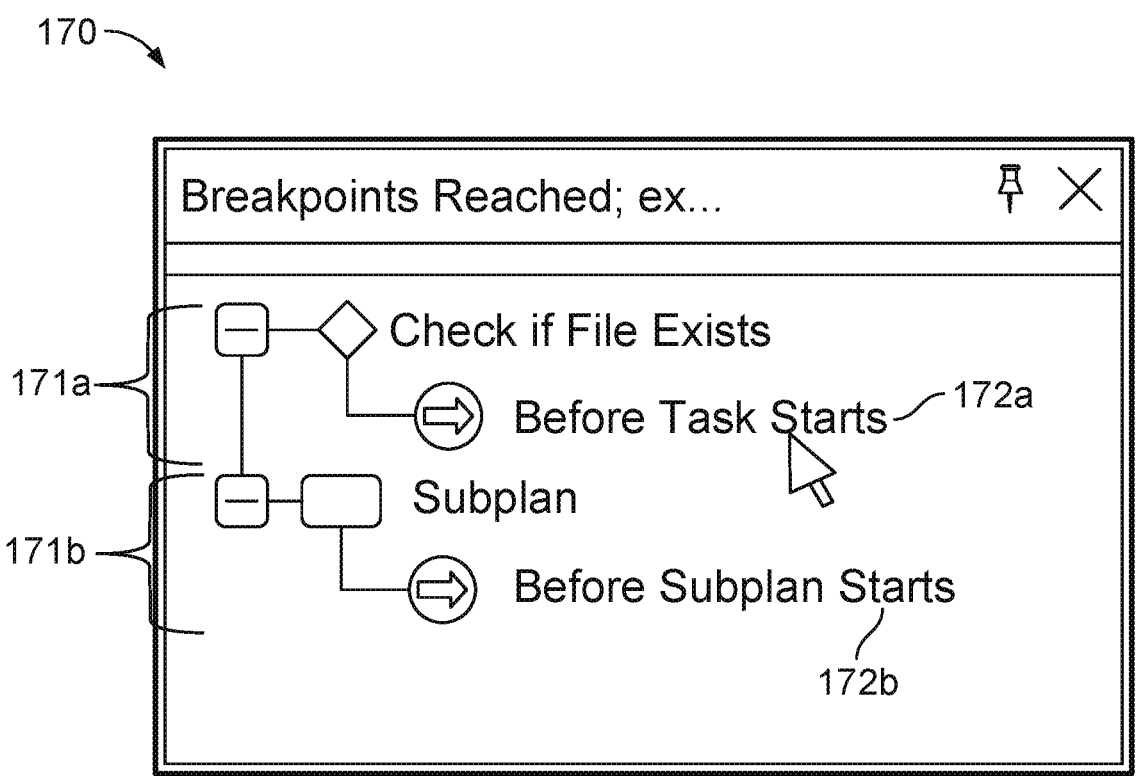

Referring to FIG. 7B, breakpoint reached user interface 170 is displayed (e.g., in proximity to or juxtaposed to graphical user interface 160 in FIG. 7A), e.g., once one or more of the breakpoints represented by breakpoint indicators 164a, 164b are encountered. In this example, both of the breakpoints represented by breakpoint indicators 164a, 164b are encountered, e.g., at a same time. Because a breakpoint reached user interface lists the locations of a plan that are currently paused, breakpoint reached user interface 170 includes portion 171a that specifies that plan 102 is currently paused at a particular functional module, namely, at task 104 due to a "before task starts" breakpoint (represented in area 172a of portion 171a)—as specified by breakpoint indicator 164a. Breakpoint reached user interface 170 also includes portion 171b that specifies that plan 102 is currently paused at another functional module, namely, subplan 112 due to a "before subplan starts" breakpoint (represented in area 172b of portion 171b)—as specified by breakpoint indicator 164b.

In this example, upon selection of one of portions 171a, 171b (or of areas 172a, 172b in portions 171a, 171b, respectively, that specify the type of breakpoint encountered), a breakpoint inspector user interface is displayed and presents parameters, environment variables, and so forth for the functional module represented in the selected portion.

Figure 8:
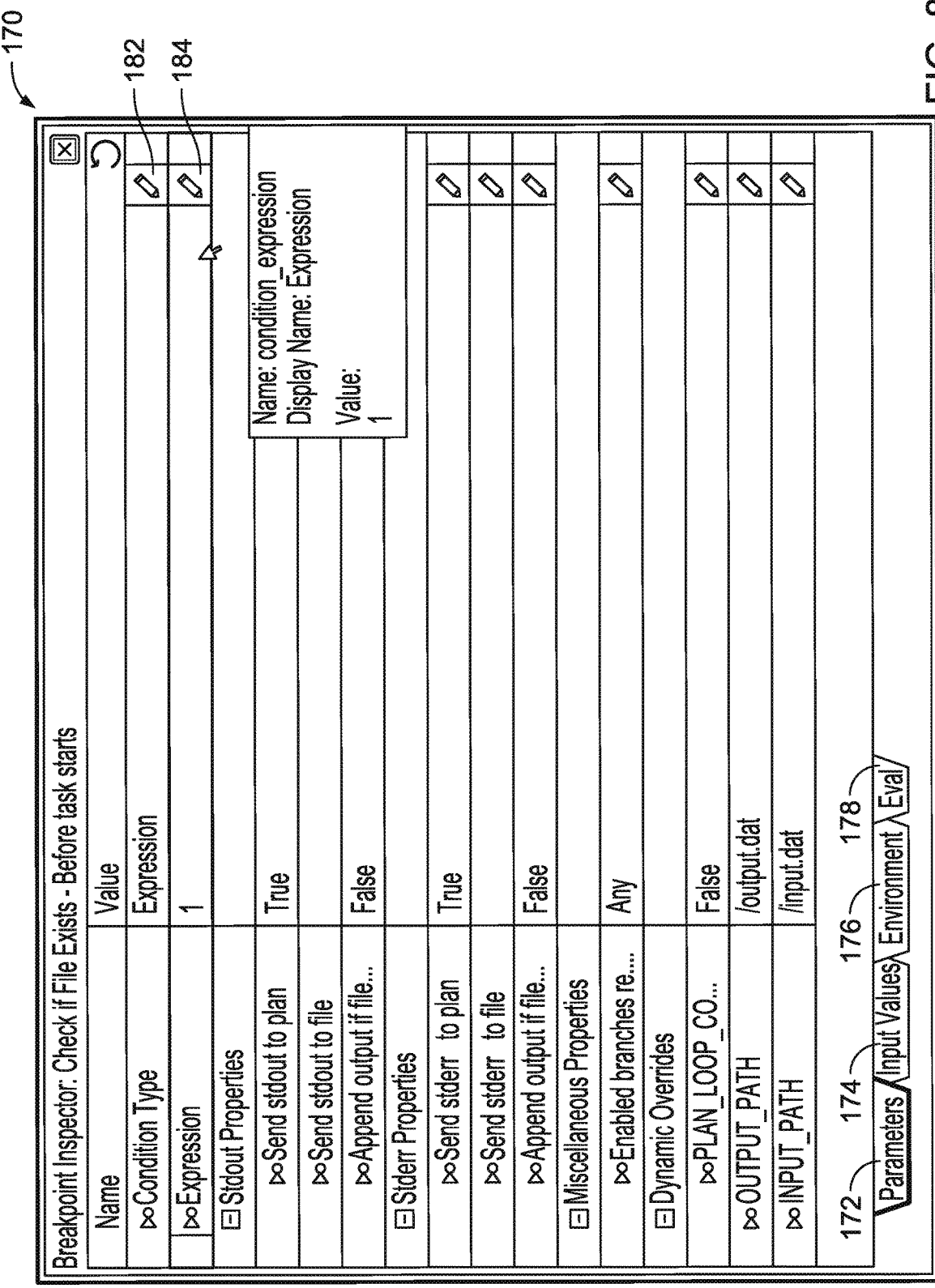
FIGS. 8 and 9A are each diagrams of a breakpoint inspector for viewing and editing attributes of elements of a plan.

Referring to FIG. 8, graphical user interface 180 is displayed once a breakpoint is reached and is an example of a breakpoint inspector user interface. In this example, graphical user interface 180 is displayed once the breakpoint represented by breakpoint indicator 164a (FIG. 7A) is reached and following selection of portion 171a in breakpoint reached user interface 170 in FIG. 7B. In this example, graphical user interface 180 displays parameters tab 172 for displaying parameters and associated parameter values of the task (which in this case is task 104 in FIG. 7A). In this example, controls 182, 184 provide for editing of various parameter values. In this example, selection of control 184 provides for editing of a parameter value that specifies a value for an expression, i.e., specifying whether the expression has a value of "0" or "1."

Graphical user interface 180 includes input values tab 174 that displays input values for task 104, environment tab 176 that displays execution environment variables or parameters and associated values for plan 102 (FIG. 4 and FIG. 7A) and evaluation tab 178, which provides controls and/or input boxes for writing expressions that are then evaluated against the state of execution of the plan and the current paused location.

Each of tabs 172, 174, 176, 178 provides controls for editing appropriate values (e.g., of variables, parameters, input values and environment variables or parameters). Once a user is done editing values in one or more of tabs 172, 174, 176, 178, a user can specify (e.g., via selection of a control) to continue running the plan, e.g., from all of the breakpoint locations that might have been reached. In a variation, a user can select a particular breakpoint location and just continue from that breakpoint location.

Figure 9A:
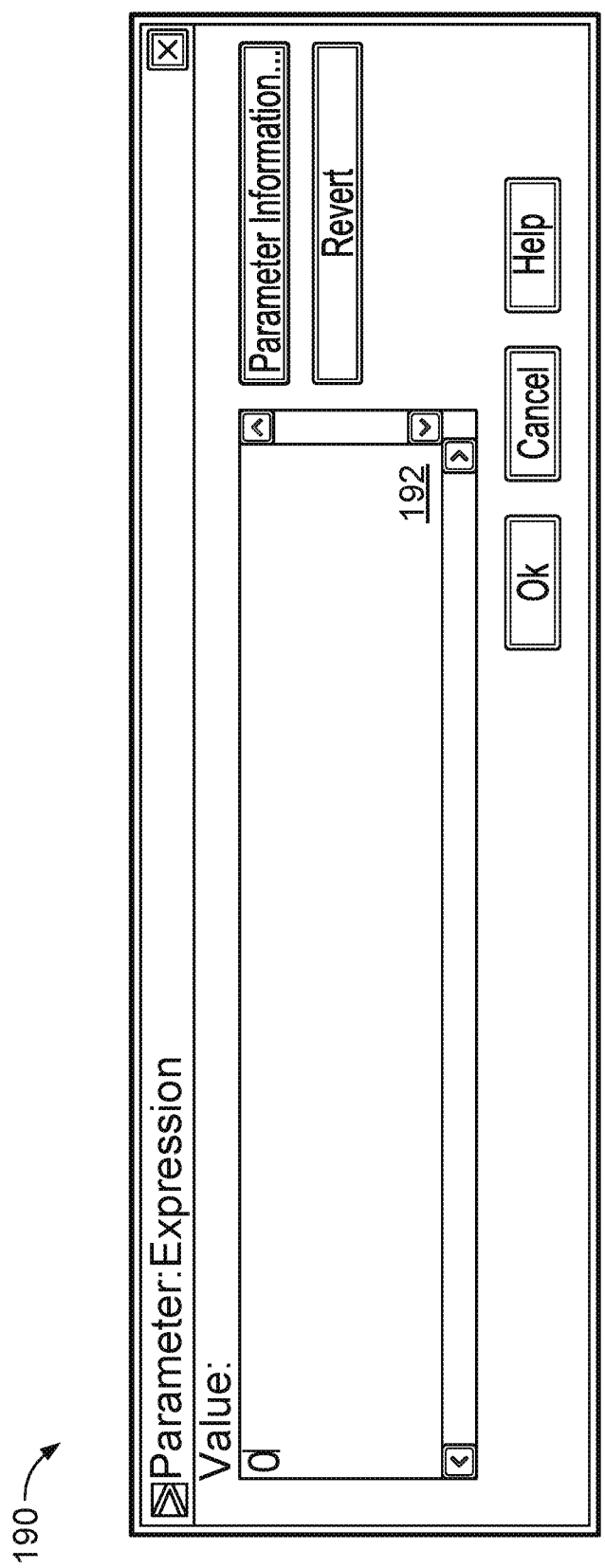

Referring to FIG. 9A, graphical user interface 190 is displayed following selection of control 184 (FIG. 8). Graphical user interface 190 includes input portion 192 for modifying the values of the parameters or variables, e.g., for modifying a value of a parameter that specifies an expression. In this example, input portion 192 allows for entry and modification of a parameter value that specifies whether the expression evaluates to true (value of "1") or false (value of "0"). In this example, the breakpoint represented by breakpoint indicator 164a can be used to modify control flow, e.g., by forcing traversal from the process (or task) represented by task 104 to the process (or task) that is represented by task 106 (e.g., when the parameter expression is set to a value of "1") or by forcing traversal from task 104 to task 108 (e.g., when the parameter expression is set to a value of "0").

Referring to FIG. 9B, graphical user interface 191 is displayed, e.g., following completion of editing in FIGS. 8 and 9A. In this example, graphical user interface 191 displays continue control 191a, selection of which continues execution of plan 102 from the breakpoint locations (i.e., represented by breakpoint indicators 164a, 164b) that are encountered.

Figure 9C:
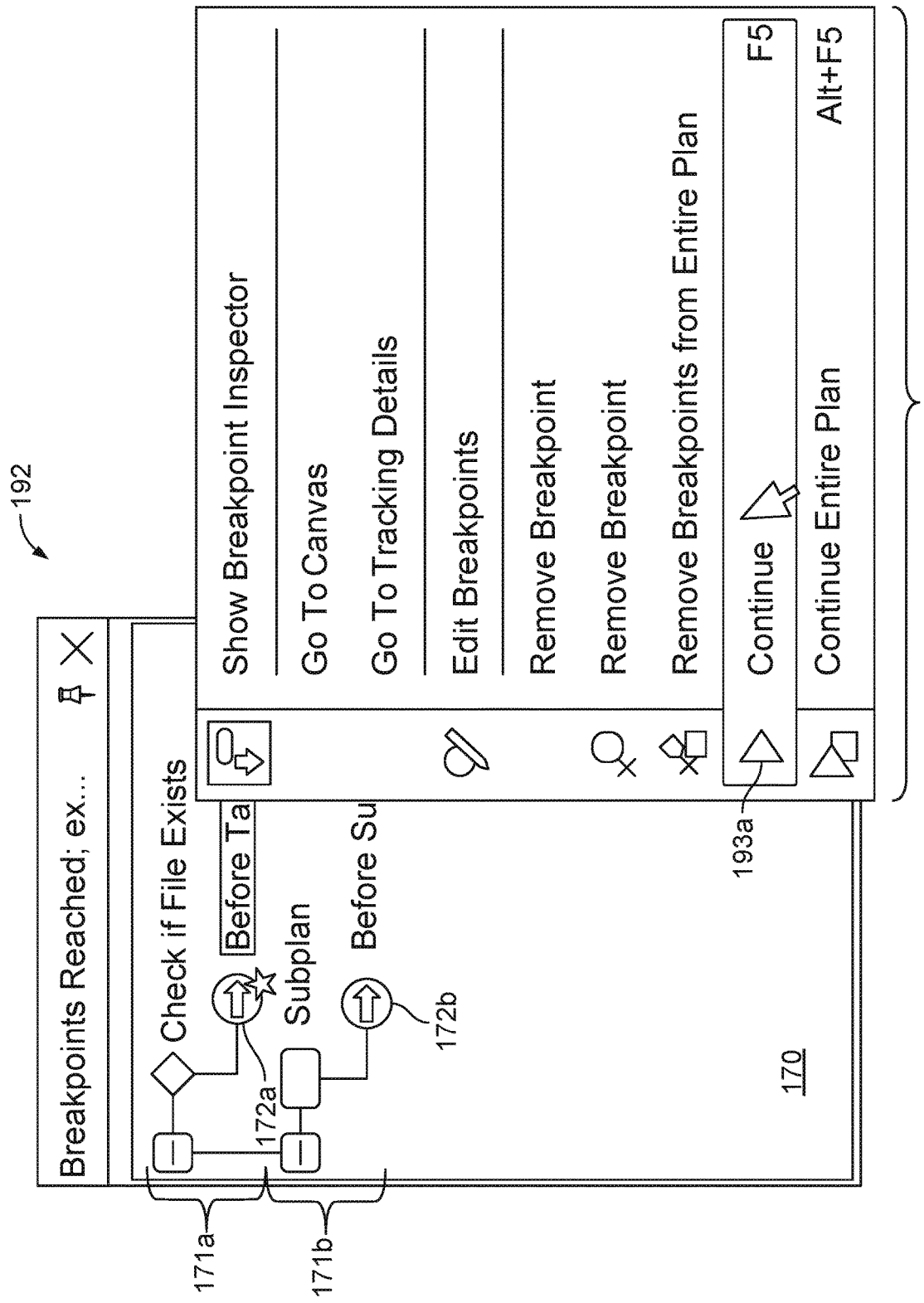

Referring to FIG. 9C, graphical user interface 192 also displays controls (or selectable portions of a user interface) that a user can select to continue plan execution from a particular breakpoint location. In this example, graphical user interface 192 includes breakpoint reached user interface 170 (previously shown in FIG. 7B) with overlay 193. Selection of area 172a in portion 171a of breakpoint reached user interface 170, causes overlay 193 to be presented. Overlay 193 includes control 193a, selection of which instructs the system to continue plan 102 from the breakpoint represented in area 172a, namely, the breakpoint represented by breakpoint indicator 164a in FIG. 7A.

Figure 10:
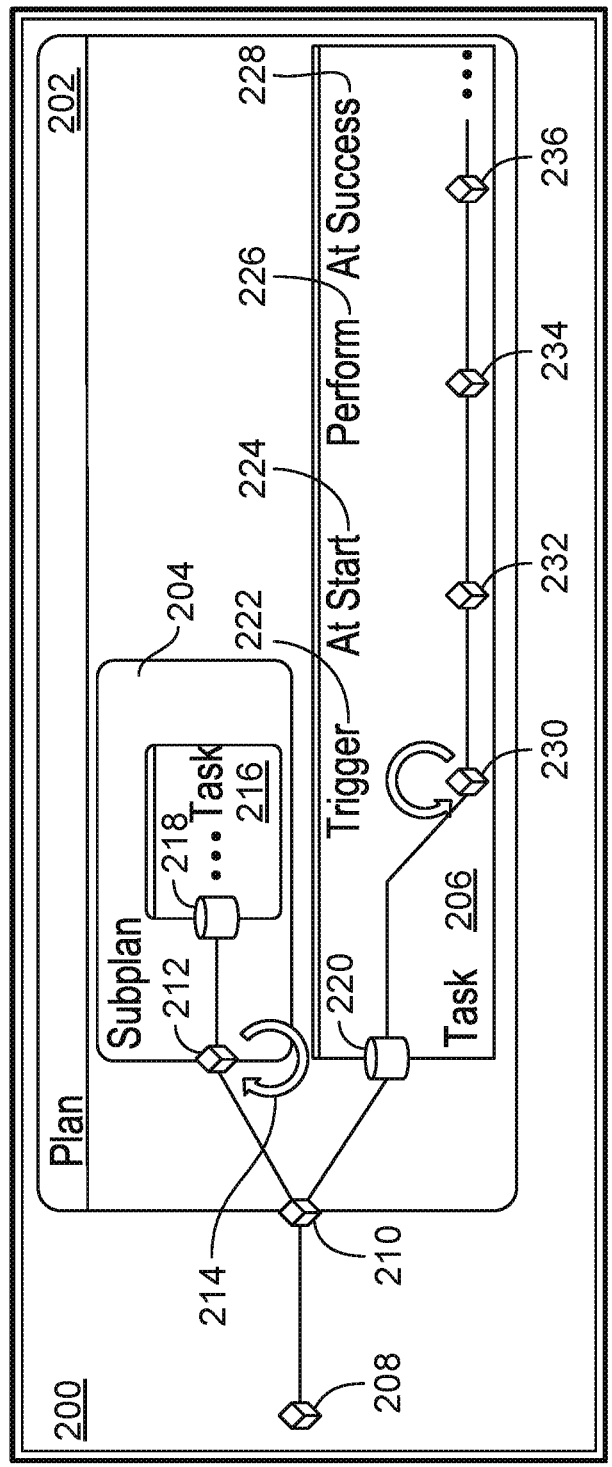
FIG. 10 is a diagram of an execution environment for a plan.

Referring to FIG. 10, execution environment 200 is hosted on one or more computers. Each element within execution environment 200 (e.g., plan 202, subplan 204 and graphical program element 206 (that represents a task) included in plan 202) evaluates parameters as those parameters enter the scope of execution. For the convenience of the reader, whenever reference signs indicating graphical program elements are referred to, the respective tasks are directly referred to when describing the following FIGS. 10-12. As such, graphical program element 206 is hereinafter referred to as task 206. As described herein, breakpoints can be set to provide for viewing and modifying of these parameter values at various levels of a plan. Generally, a plan environment includes a computerized environment for execution and definition of a plan. In general, the order in which parameters enter the scope of execution is as follows. Execution environment 200 includes execution environment parameters 208, including, e.g., parameters defined in a plan's environment, perhaps through the plan's sandbox or project. Execution environment parameters 208 are available to plan 202 before it begins to run. Plan 202 includes or accesses plan-level parameters 210, including, e.g., parameters that are declared at the plan level and evaluated when plan 202 starts running. Plan 202 may also reference parameters (i.e., execution environment parameters 208) from its execution environment (i.e., execution environment 200); these values are also resolved when plan 202 starts to run.

In this example, plan 202 includes subplan 204 with subplan-level parameters 212, which the system resolves when subplan 204 starts running. In this example, subplan 204 is a looping subplan, as indicated by looping symbol 214. Generally, a looping subplan includes a subplan that is configured to loop a specified number of times or until a condition is satisfied. In this example, a looping subplan is a functional module that loops and can be repeated. As such, for each loop, a breakpoint can be set before, in or after that loop. The system (or an engine running on the system) also re-evaluates subplan-level parameters 212 each time subplan 204 starts a new loop. When subplan 204 loops, the values of its parameters can be made dynamic and passed from one loop to the next. By using breakpoints for subplan 204, the values of those parameters can be viewed and modified for use in a next loop. However, if subplan 204 is configured to loop concurrently, the parameter values remain private to each iteration.

In this example, subplan 204 includes task 216 (with task-level resources 218) and plan 202 includes task 206 (with task-level resources 220). When a plan's flow of control reaches a particular task's input port, that task enters execution scope. Before the system can run the methods of a task, the system locates and acquires resources for that task. In this example, apart from hidden parameters it needs to access resources, the system does not resolve parameters at the task level. As such, the parameters that are viewable and editable for a task (e.g., through tab 172 in FIG. 8) are evaluated when a Perform method for the task starts.

In this example, task 206 includes Trigger method 222, At Start method 224, Perform method 226, and At Success method 228. In this example, Trigger method 222 and At Start method 224 set up the environment (and/or situation) for the controlled application to run. Perform method 226 causes the controlled application to run. At Success method 228 runs, when the results of execution of the controlled application indicate a successful run of the controlled application.

Trigger method 222 may be implemented to represent the starting point of task 206. Trigger method 222 may include various conditions for starting the execution. These various conditions include, e.g., whether a specific file exists, whether a flag has been set to true, and so forth. In this example, task 206 includes method-level parameters 230, 232, 234, 236. After resources have been acquired, the task's methods begin to enter execution scope. In this example, the system executes methods in a predetermined order. As such, the system described herein resolves method-level parameters in the same order.

The first of a task's methods to enter the scope of execution is Trigger method 222. When this happens, the systems resolves method-level parameters 230 declared on or referenced by Trigger method 222. In this example, parameter values that are set by the system in Trigger method 222 can be passed on to methods that follow, e.g., by declaring those parameters as dynamic parameters. Assuming Trigger method 222 succeeds, the next method to enter the scope of execution is the At Start method 224, which includes method-level parameters 232, e.g., dynamic parameter values that were set in Trigger method 222.

In this example, method-level parameters 234 of Perform method 226 are set in a user interface (e.g., in a task properties dialog parameters tab). The system evaluates these parameters when the Perform method 226 enters the scope of execution—after Trigger and At Start methods 222, 224, respectively, have run. As with the preceding methods, a breakpoint can be set before Perform method 226 to enable modification of parameter values and to pass those modified values to subsequent methods, e.g., an At Failure method (not shown) and At Success method 228. Method-level parameters 236 of At Success method 228 have access to parameter values set by Perform method 226. In this example, when a task's methods finish running, their local parameter values are not saved. However, the next task has access to plan parameters, as well as to any values exported to the execution environment. A task also leaves behind the altered values of any parameters that it declared to be dynamic. These can be seen by successor tasks. The system can be configured to set breakpoints, relative to where parameters get resolved, as described in FIGS. 11 and 12.

Figure 11:
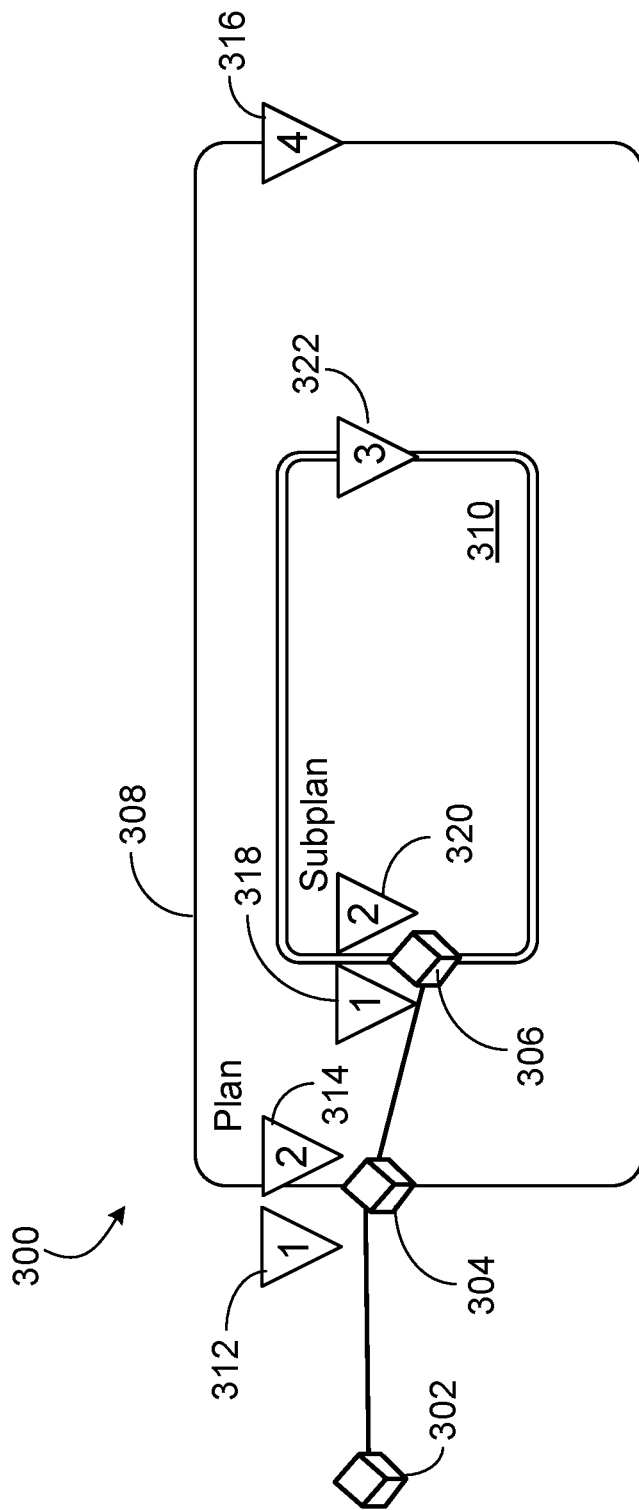

Referring to FIG. 11, diagram 300 illustrates that breakpoints for plan 308 or subplan 310 can be set (e.g., recorded by the system, as described above) at various positions, with each position providing for the ability to monitor or edit various types of parameter values, including those described above. In this example, execution environment parameters 302 are set before plan 308 is run. Plan 308 includes or accesses plan-level parameters 304. Subplan 310 includes or accesses subplan-level parameters 306. In this example, the system can set a breakpoint at position 312 to stop execution of plan 308 before it starts. The setting of the breakpoint at position 312 provides for modification of plan-level parameters 304. The system can set a breakpoint at position 314 (within plan 308) to stop execution of plan 308 just before it starts its contents. The system can also set a breakpoint at position 316 to stop the execution of plan 308 after it finishes and before it exits. The system can set a breakpoint at position 318 to stop execution of subplan 310 before it starts. The setting of the breakpoint at position 318 provides for modification of subplan-level parameters 306. The system can set a breakpoint at position 320 (within subplan 310) to stop execution of subplan 310 just before it starts its contents. The system (and/or a user) can also set a breakpoint at position 322 to stop the execution of subplan 310 after it finishes and before it exits.

Figure 12:
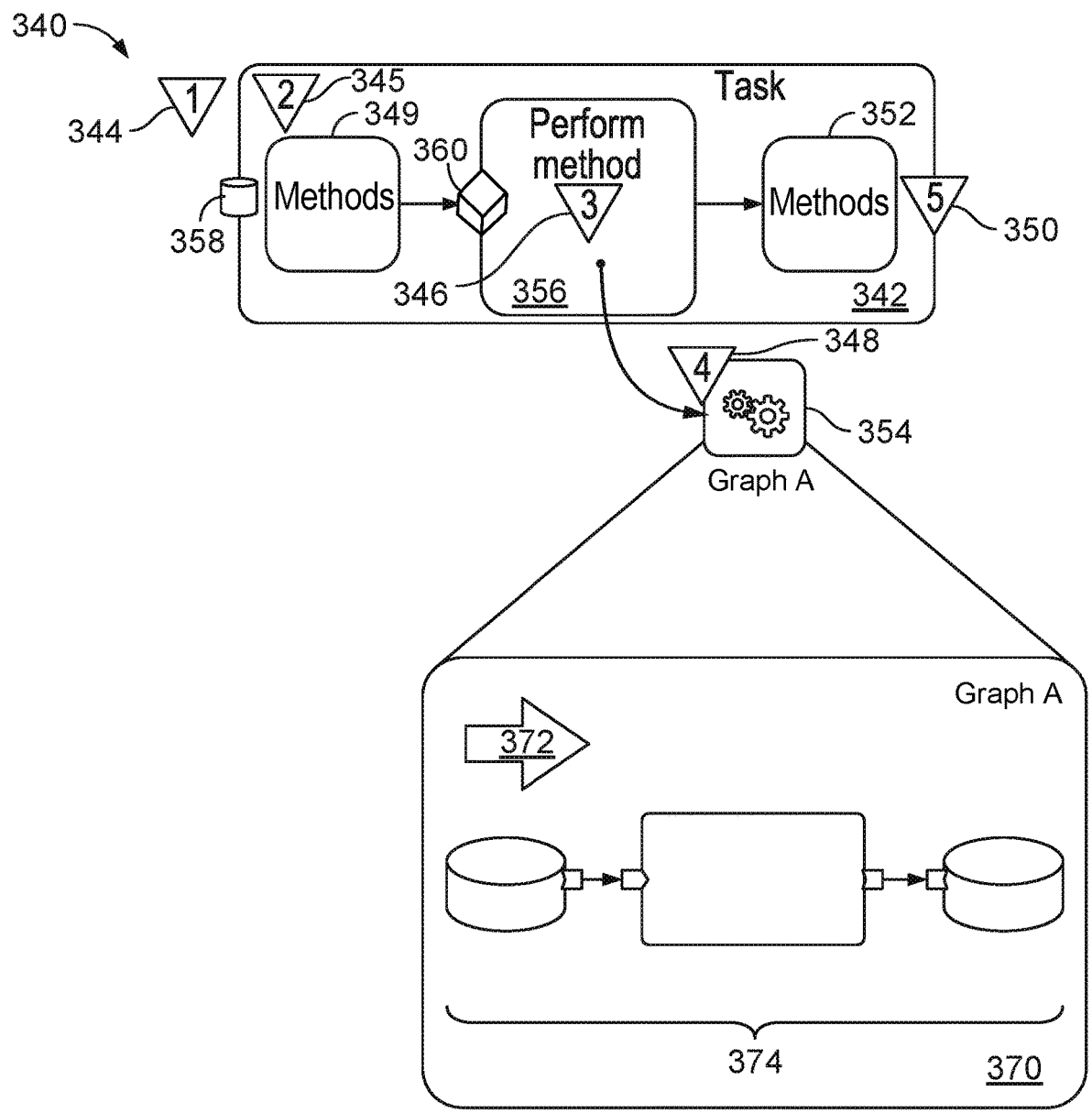
FIG. 12 is a diagram of a task.

Referring to FIG. 12, diagram 340 illustrates that breakpoints for task 342 can be set at five distinct positions 344, 345, 346, 348, 350. In this example, task 342 includes methods 349 (e.g., Trigger and At Start methods, each of which may be optional and are framework methods), Perform method 356 and methods 352 (e.g., an At Success method, an At Failure method and/or an At Rollback method, each of which may be optional and are also framework methods).

Task 342 also includes task-level resources 358 and method level parameters 360. In this example, a breakpoint at position 344 stops the execution of task 342 before it starts. When task 342 is a program, plan or graph task, this is before task-level resources 358 are acquired. For a graph task, this is also before the graph is compiled. The setting of a breakpoint at position 344 enables modification of method parameters 360.

In this example, position 345 is the "in" breakpoint position on task 342 (e.g., which is the same as "before" position 52a (FIG. 3) on Perform method 52 (FIG. 3)). That is, the setting of a breakpoint at position 345 stops the execution of the Perform method (of task 342) before that Perform method starts (not right before the Perform method runs its script or executable). For graph and plan tasks, this breakpoint position 345 causes a launching of a breakpoint inspector through which input expressions (used or executed by the graph and plan tasks) are editable. As such, these new expressions will be evaluated and sent to the launched graph or plan.

The system may also set a breakpoint at position 346, in Perform method 356. That is, position 346 is the "in" position for Perform method 356 (e.g., the same as position 52b in FIG. 3). When the breakpoint is set at position 346, the system stops the execution of a program task just before its Perform method runs its script or executable, stops the execution of a plan task just before its Perform method runs its child plan or stops the execution of a graph task just before its Perform method runs its graph. For plan, graph and program tasks, a breakpoint at position 346 enables modification of environment variables (e.g., the changing of environment variables for those processes that will be spawned for plan, graph and program tasks). For graph and plan tasks, a breakpoint at position 346 also enables viewing of the input values to be used for graph 354.

In this example, Perform method 356 is configured to initiate or spawn graph 354. (In a variation, Perform method 356 may be configured to initiate a child plan, rather than a graph 354). In this example, a breakpoint can be set at position 348 to stop execution at the start of graph 354, and open that graph 354 in a new tab (e.g., window 370 that shows contents of graph 354). Window 370 displays contents of graph 354 (which in this example is graph 374) and shows that execution is paused, e.g., through visualization 372. From the opened graph or child plan, a user can inspect the current state, set additional breakpoints, or use a "continue control" to resume execution of the graph or child plan. This type of breakpoint is referred to as "break within graph/child plan" or as a "within breakpoint." This creates a situation where the plan starts a graph or child plan, and a debugger is automatically started for that graph or child plan—the debugger then stops the graph or child plan, right at the beginning of its execution. For example, this capability is useful when the graph or child plan to execute is determined dynamically as the plan runs—that is, when which graph or child plan to execute is not predetermined at edit time prior to the running of the plan, so no breakpoint can be set explicitly for it. In this example, the within breakpoint will result in stopping the execution of the graph or child plan that is actually run.

For a within breakpoint, a debugger for the launched process is automatically started, and the GDE essentially represents a relationship between what are two separate, individual processes. This is because one machine has the process of the parent plan and the process of the debugger for the parent plan. A second machine has the process of the launched graph or child plan. This second machine also has the process of the debugger for the launched graph or child plan. As such, one graph in a plan could be running on the system described herein and another graph could be running on another machine, and the user could use the graph debugger to investigate the local environment on that machine.

In another example, the break within graph causes the GDE to switch over (the debugger) to view aspects and attributes of the graph (e.g., graph 374), rather than viewing aspects of the parent task (e.g., task 342). Additionally, the graph or child plan (even though it is being executed as a distinct process from task 342) can be debugged in the same user interface and in the same graphical development environment (GDE) as task 342. In this example, the system can set a breakpoint at position 350 to stop execution of task 342 after it finishes.

In some examples, once task 342 is stopped, the user can specify whether task 342 should continue as though it has succeeded or as though it has failed. The system records these user changes and specifications and acts on them, e.g., by modifying the state of a task (or method) in accordance with the user changes, and by doing so, controlling which tasks or methods are executed next. The system implements control flow by changing the state of the method from success to failure and vice versa.

Additionally, in some examples, a graphical user interface is presented (at an "after" breakpoint, e.g., breakpoint at position 350 on task 342) that enables modification of a record of whether the task succeeded or failed (which then affects where the control goes next). In some examples, the user interface enables modification of records after execution of particular types of tasks or methods, e.g., a conditional task and after the Perform method of a graph task or a plan task.

Additionally, the system described herein provides for the setting of breakpoints at specialized positions. For example, a plan or subplan may be a looping plan or a looping subplan (e.g., that is configured for serial loops or concurrent loops). Generally, a looping plan includes a plan that is configured to loop a specified number of times or until a condition is satisfied. For a looping plan or subplan, a breakpoint can be set to pause on each iteration of the loop or an iteration-specific breakpoint ("iteration breakpoint") can be set that will pause only on a specified iteration. For example, in the recording of a breakpoint, the system can specify that the pause in execution only happens for an instance of the plan/subplan/task/method that corresponds to a particular iteration of that loop (e.g., thereby specifying which instance of the plan/subplan/task/method the breakpoint applies to, given that the plan/subplan/task/method is within a loop and because of that there will be many separate instances of it that are executed). Additionally, the system can be configured to set a conditional breakpoint, including, e.g., a breakpoint that is configured to interrupt execution of the plan, subplan or task only when a particular condition is satisfied. In this example, the breakpoint includes or is associated with an expression and the system is configured to execute the breakpoint only when the expression satisfies a specified value, such as "1" or "0." The system can set or otherwise specify a condition for any of the various types of breakpoints described herein to make a breakpoint stop only if a specified condition is true—thus making each of the various type of breakpoints a conditional breakpoint. For example, an iteration breakpoint can have a condition specified for it. That is, a breakpoint set on the instance of a task that is part of a second loop execution, for example, can also specify that execution should only pause when a condition (that is independent of the looping) is satisfied.

In addition to the graphical plan debugger, the system provides a command line version. The system can connect the command line debugger to a running plan and provide the various types of debugging that could be performed graphically.

Figure 13:
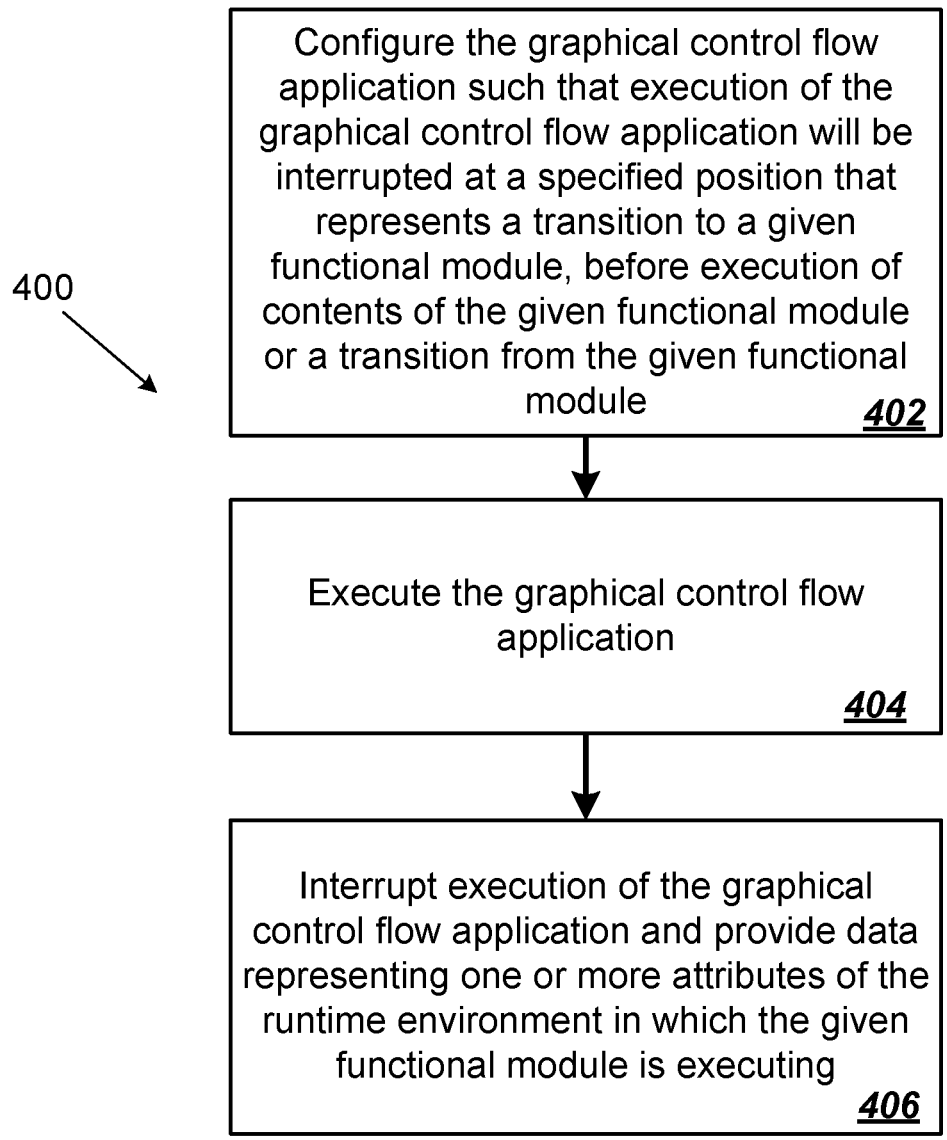
FIG. 13 is an example process for interrupting execution of a graphical control flow application.

Referring to FIG. 13, process 400 is implemented by the system in debugging a graphical control flow application that specifies control flow among a plurality of functional modules, with the control flow being represented as transitions among the plurality of functional modules and with each functional module being configured to execute one or more actions. In operation, the system specifyies (402) a position in the executable control flow graph at which execution of the executable control flow graph is to be interrupted. The specified position represents a transition to a given functional module, a transition to a state in which contents of the given functional module are executed or a transition from the given functional module. The system also starts (404) execution of the executable control flow graph in an execution environment. Generally, an execution environment is the environment provided to a plan or software by an operating system, e.g., at run-time. In this example, at a point of execution representing the specified position, the system interrupts (406) execution of the executable control flow graph and provides (408) data representing one or more attributes of the execution or runtime environment in which the given functional module is executing, e.g., internal attributes of the execution or runtime environment running the plan (e.g., such as parameters and associated values, dynamic parameters that the plan is using and associated values and so forth) and external attributes of the execution or runtime environment running the plan (such as a local environment or system that is executing the plan and external states and resources (e.g., databases and repositories)).

In some examples, the executable control flow graph includes a graphical layer and a control processing layer, wherein the graphical layer includes visuals for a graphical user interface and a visual program in a visual programming language that is programmed with the visuals, with the visual programming language being for specifying the control flow, wherein the control processing layer includes functional modules, methods, underlying data structures used in executing the methods, and code that executes the methods using the underlying data structures to effect the control flow specified by the visual programming language. In this example, the method also includes executing the graphical layer by rendering the graphical user interface with the visuals;

receiving, through the graphical user interface, data representing user manipulation of one or more of the visuals displayed in the graphical user interface, with the received data representing the visual program in the visual programming language; and executing the control processing layer in accordance with the visual program created in the graphical layer, with execution of the control processing layer including executing one or more functional modules specified by the visual program, with execution of a functional module causing execution of a method of that functional module by executing code using one or more data structures of the method to effect the control flow specified by the visual programming language. In this example, a particular functional module represents a controlled application included in a data processing layer, wherein the method further includes: executing a particular method of the particular functional module; and responsive to executing the particular method, launching the controlled application.

In a variation of FIG. 13, the configuring (e.g., setting) of breakpoints can occur while the graphical control flow application is executing, in addition to or rather than configuring breakpoints prior to executing the graphical control flow application.

In an example, the system described herein can be configured to single-step through breakpoints. A single-step is a control or other command that, when a breakpoint is hit, instructs the system to go to the next place where the plan execution can be interrupted, without having to explicitly set a breakpoint there. In this example, a user instructs the system to single-step through a plan. In this example, the system (or a user) would specify a given level (e.g., a task level or a method level) through which to single-step. In this example, a plan can have multiple paths of control flow, resulting in more than one "next" place. As such, the system would stop execution at all of those places.

Figure 14A:
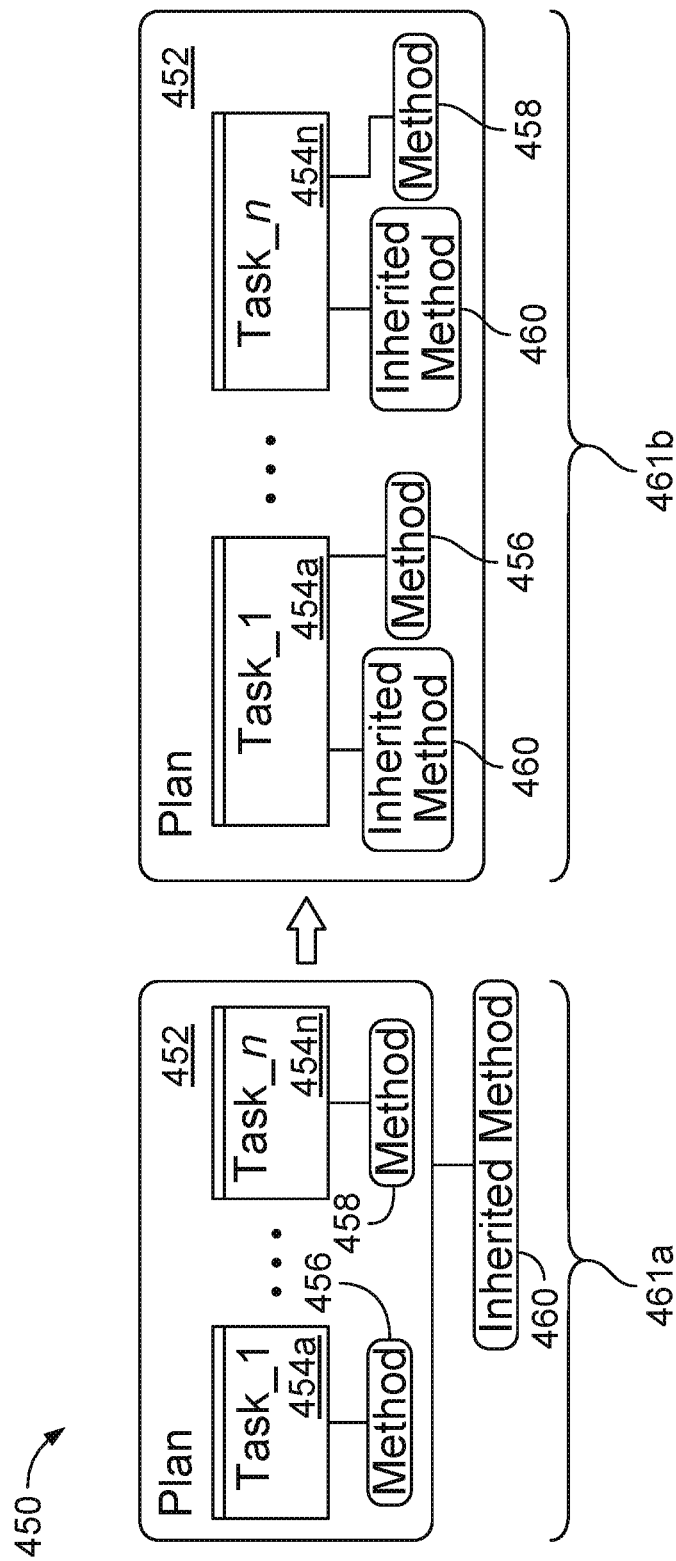
FIG. 14A is a diagram of inherited methods.

Referring to FIG. 14A, diagram 450 shows plan 452—both being defined in portion 461a and being executed in portion 461b. In this example, plan 452 includes graphical program elements 454a . . . 454n that are representing respective tasks. For the convenience of the reader, whenever reference signs indicating graphical program elements or transitions are referred to, the respective tasks and control flow, respectively, are directly referred to when describing the corresponding FIGS. 14A-14B. As such, graphical program elements 454a . . . 454n are hereinafter referred to as tasks 454a . . . 454n.

Each of tasks 454a . . . 454n includes one or more methods, each method including one or more actions to be executed on a computer system. For example, task 454a includes method 456 and task 454n includes method 458. Method 456 may be a same method or a different method from method 458. In this example, each of tasks 454a . . . 454n inherit inherited method 460 from plan 452. Generally, an inherited method includes a method that is defined once at the plan level, and that applies to (is inherited by) the tasks within the plan. That is, inherited methods are actions defined at the plan (or subplan) level that apply to the tasks below that level. Through use of an inherited method, the system can apply the same method to the tasks in a plan. The inherited method is defined once for the whole plan rather than separately for every task, enabling assignment of the same action to many tasks at once. As shown in portion 461b of diagram 450, when the system executes plan 452, inherited method 460 executes in every task inside plan 452, namely, in each of tasks 454a . . . 454n in plan 452. In some examples, when a task includes both inherited and non-inherited methods, the system executes the methods in a different order depending on whether the methods occur before or after the task's Perform method. Before the task's Perform method, the system executes the inherited method first, followed by the analogous non-inherited method for that particular task. After the task's Perform method, the system executes the non-inherited method first, followed by the analogous inherited method.

Figure 14B:
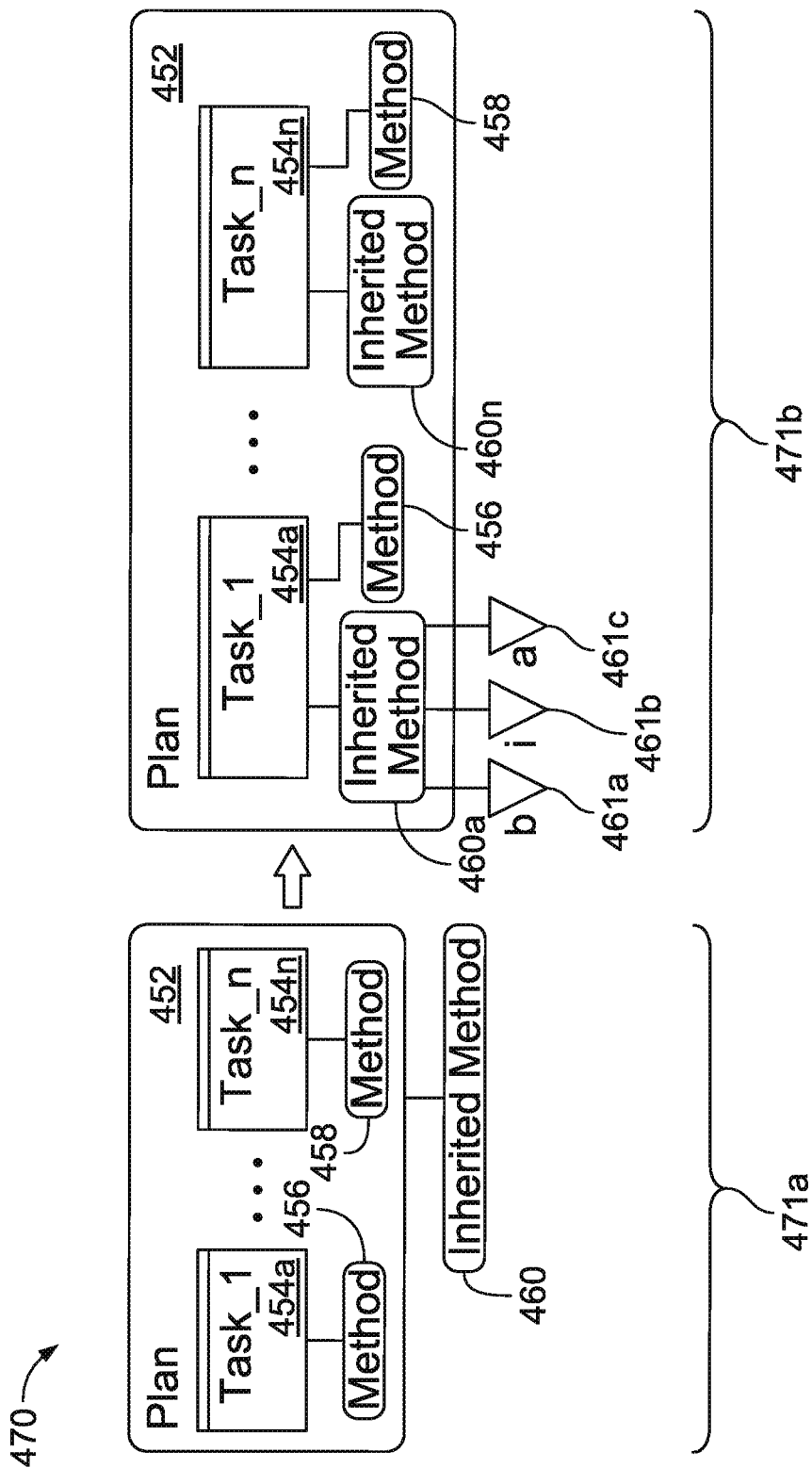
FIG. 14B is a diagram of setting a breakpoint on inherited methods.

Referring to FIG. 14B, diagram 470 illustrates that the plan debugger enables the setting of breakpoints on inherited methods. In particular, diagram 470 illustrates plan 452—both being defined in portion 471a and being executed in portion 471b. Inherited method 460 is defined once on the plan level (shown in portion 471a). During execution (shown in portion 471b), each element (i.e., each of tasks 454a . . . 454n) within plan 452 will inherit that method definition by creating a specific instance (i.e., instances 460a . . . 460n) of the inherited method 460 for that particular element. In this example, a breakpoint—for an instance of inherited method 460—is set or recorded per task, e.g., one or more of tasks 454a . . . 454n. That is, a breakpoint can only be set on a specific instance of an inherited method. In this example, the system records a breakpoint before, in or after instance 460a of inherited method 460 of task 454a, by recording a breakpoint at one of positions 461a, 461b, 461c, respectively. In this example, the system may record a breakpoint at one or more of positions 461a, 461b, 461c (even though all of positions 461a, 461b, 461c are shown in FIG. 14B for purposes of completeness).

Figure 15:
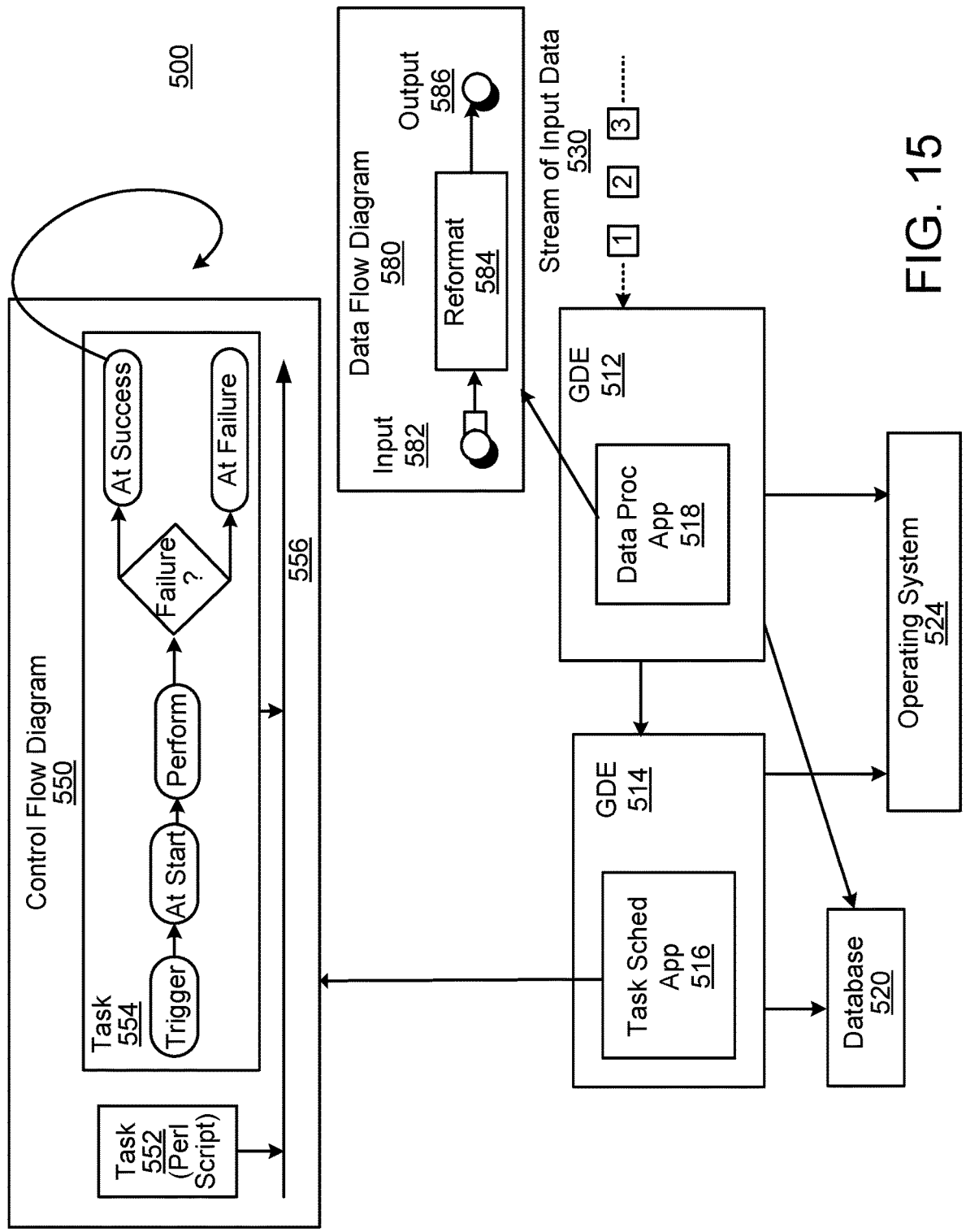
FIG. 15 is a block diagram of a data processing system.

Referring to FIG. 15, a block diagram of an application development and execution system 500 is shown. The debugging techniques described herein may be implemented within system 500. The system 500 includes two graphical development environments, a GDE 512 used for dataflow graph development and a GDE 514 used for control flow diagram development. Alternatively, one graphical development environment can be used for development of both dataflow graphs and control flow diagrams. Or a graphical development environment can be used for developing control flow diagrams and a command line user interface can be used for dataflow graphs, or vice versa.

Using the GDE 512, a data processing application 518 is built that includes a dataflow graph 580. Using the GDE 514, a task managing application 516 is built that includes a control flow diagram 550.

The system 500 also includes a database 520. The database 520 may be a scalable object-oriented database system that provides storage for various kinds of information (e.g., metadata) for the system 500. The database 520 may be, for example, an enterprise metadata database, which can support the development and execution of graph-based applications and the interchange of data between the graph-based applications and other systems, e.g., operating systems.

The system 500 further includes an operating system 524. The operating system 524 may be, for example, a parallel operating environment. The operating system 524 provides support for running application development environments, such as GDE 512 and GDE 514, and provides for scalable parallel and distributed execution of the applications developed.

In FIG. 15, a stream of input data 530 goes through the dataflow graph 580, as the data is being processed by the data processing application 518. The dataflow graph 580 includes a computation component, which is reformat component 584. In the dataflow graph 580, the data flows from input dataset 582 to output dataset 586.

After being reformatted, the data flows out of the data processing application 518 and into the task managing application 516, and is used to drive the task managing application 516, which in turn drives the control flow diagram 550. In an example, iif the data processing application 518 succeeds, the task scheduling application 516 will launch the control flow diagram 550. The control flow diagram 550 shows two tasks, task 552 and task 554, each of which may be programmed with breakpoints (before, in or after the task) as described herein. A task may be a computation performed, for example, by executing a data-flow graph or a script, such as a Perl script. A time sequence 556 shows the running sequence of the tasks specified in the control flow diagram 550. In this case, the task 552 is executed before the task 554.

As shown in FIG. 15, the task 552 in the control flow diagram 550 is a Perl script and the task 554 includes several methods that can be executed in an operating system 524 of the system described herein. These methods may be existing methods provided by the system described herein. The user can customize the behavior of these methods by specifying their own content for various parameters and scripts that makeup a method. Breakpoints may be inserted before, in or after each of these methods, as described herein. As shown in FIG. 15 as an example, the task 554 includes five methods: Trigger, At Start, Perform, At Failure, and At Success.

In some examples, the above five methods may be implemented as follows.

Trigger method may be implemented to represent the starting point of the task 554. It may include various conditions for starting the execution, including, e.g., whether a specific file exists, whether a flag has been set to true, and so forth.

At Start method may be implemented as a method that prepares the system for the Perform method, such as setting environmental variables to desired values, or setting up log files to log runtime information.

Perform method may be implemented to perform the main functionality of the task 554. Task 554 may also contain conditional logic to handle what happens after Perform method. If Perform method succeeds during its execution, At Success method is executed to exit task 554 with a return code of zero. If Perform method fails during its execution, At Failure method is executed to exit task 554 with a return code of non-zero. Optionally, additional methods can be added for rollback, error handling, and recovery. For example, a method of rollback can be added to roll back what has been done in reverse execution order starting at the point of failure. Alternatively, a method of cleanup can be added to clean up the failed conditions, by resetting flags, registers, etc.

As described herein, a functional module encapsulates information for or representing a controlled application, wherein the controlled application is an instance of an executable computer program or an executable portion of the computer program, and wherein the functional module is configured to execute one or more actions on a computer system. The control flow is the order in which individual functional modules are executed or evaluated.

Using the techniques described herein, a system and method debugs plans and subplans. For example, a plan debugger is described herein to troubleshoot these plans—the debugger has both a command line and a graphical interface. The plan debugger enables execution of the plan to pause (or "break") at many key points within these plans. This plan operates in a distributed manner on heterogeneous machines and technologies. The debugger provides for debugging and debugger functionality, such as conditional breakpoints, or breaking on a particular iteration of a loop, or break-on-failure. The debugger enables breaking at different levels of the plan: plan, subplan, task or method. The break can be set (a) before, (b) after, or (c) in (in the case of tasks and methods) and within (in the case of controlled applications that are graphs and child plans) execution of any of the above—except as noted here. As described herein, setting and running with breakpoints does not slow down the plan. Additionally, a plan does not need to be put into "debug mode" to use the debugger. A user can either set breakpoints before starting the plan or while the plan is running.

The techniques described herein provide for numerous computation and resource allocation efficiencies. For example, by being able to set a breakpoint before, in and after a task and also before, in and after each of the methods of the task, the system is able to reduce a number of executions of a task required to debug a task and/or its methods. This is because rather than waiting for a task or plan to run to completion to identify failures, the techniques described herein provide for identification of a failure when it occurs and provide the ability to modify variable and/or parameter values that may be causing the failure. Once the values are modified, the plan or task can resume execution from the point at which is previously failed. That is, "downstream" tasks and/or methods (tasks and/or methods that are dependent on another task and/or method) are executed once the failure has been identified and addressed, rather than being executed immediately after the failure and then repeatedly as the failure is debugged. This results in a decrease of consumption of processing power (as fewer executions of the plan are required to debug the plan), relative to an amount of processing power required when the plan is allowed to run to completion and then debugged after completion and then run again to assess whether the failure has been successfully addressed. This also results in a decrease in memory consumption, as the plan may only be run once and successfully debugged during that single run, relative to an amount of memory required to run the plan multiple times to debug the plan.

Additionally, the level of granularity provided by being able to set breakpoints before, in and after each of a task's methods provides for increased flexibility in the defining of the data structures that represent the task's methods, as well as increased flexibility in the investigation and control of execution behavior. Rather than having to pre-define these data structures and change its values only after a plan has executed, the values of parameters and/or values for these data structures can be modified "on-the-fly" as a plan is being executed. These on the fly modifications provide for smaller memory requirements, as the plan does not need to be executed multiple times to assess the impact of these changes.

The techniques described above can be implemented using software for execution on a computer. For instance, the software forms procedures in one or more computer programs that execute on one or more programmed or programmable computer systems (which can be of various architectures such as distributed, client/server, or grid) each including at least one processor, at least one data storage system (including volatile and non-volatile memory and/or storage elements), at least one input device or port, and at least one output device or port. The software can form one or more modules of a larger program, for example, that provides other services related to the design and configuration of charts and flowcharts. The nodes, links and elements of the chart can be implemented as data structures stored in a computer readable medium or other organized data conforming to a data model stored in a data repository.

The techniques described herein can be implemented in digital electronic circuitry, or in computer hardware, firmware, software, or in combinations thereof. An apparatus can be implemented in a computer program product tangibly embodied or stored in a machine-readable storage device (e.g., a non-transitory machine-readable storage device, a machine-readable hardware storage device, and so forth) for execution by a programmable processor; and method actions can be performed by a programmable processor executing a program of instructions to perform functions by operating on input data and generating output. The embodiments described herein, and other embodiments of the claims and the techniques described herein, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view information available on servers or networks on the Web through the use of browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description and the claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of embodiments of the invention have been described. Nevertheless, it will be understood by one of ordinary skill in the art that various modifications may be made without departing from the spirit and scope of the claims and the techniques described herein.

What is claimed is:

1. A computer-implemented method for debugging a visual program that includes graphical program elements of an executable control flow graph with one of more functional modules, with the graphical program elements representing the one or more functional modules, with control flow being represented as transitions among the graphical program elements, and with the one or more functional modules specifying controlled applications configured by the executable flow control graph to execute one or more actions on a computer system, the computer-implemented method including:

rendering, by the visual program in a graphical user interface, at least a portion of the executable control flow graph by rendering one or more of the graphical program elements that represent a given functional module of at least that portion, with the given functional module specifying one or more of the controlled applications to execute the one or more actions;

wherein the given functional module includes a method, which when executed, launches one or more of the controlled applications specified by the given functional module;

inserting, into the visual program, a breakpoint indicator specifying a position in the executable control flow graph at which execution of the executable control flow graph is to be interrupted by inserting the breakpoint indicator into the visual program in juxtaposition to a given graphical element representing the given functional module;

wherein the specified position represents a first transition to a state in which contents of the given functional module represented by the given graphical program elements are executed, a second transition from the given functional module represented by the given graphical program element, or a third transition to the given functional module represented by the given graphical program element;

executing the executable control flow graph in an execution environment, including:
if the specified position represents the first or second transitions,
executing the method of the given functional module; and
responsive to executing the method, launching the one or more of the controlled applications specified by the given functional module;

interrupting execution of the executable control flow graph when execution reaches the specified position in the executable control flow graph;

debugging the visual program by rendering, by the visual program in the graphical user interface, data representing one or more attributes of the execution environment at the specified position, with regard to the given functional module, in the executable control flow graph being executed in the execution environment; and if the specified position represents the third transition, continuing execution of the executable control flow graph, including:
executing the method of the given functional module; and
responsive to executing the method, launching the one or more of the controlled applications specified by the given functional module.

2. The computer-implemented method of claim 1, wherein the executable control flow graph is represented as a plurality of hierarchical levels, with the executable control flow graph itself being represented in a first one of the hierarchical levels, and with each functional module being represented in a second one of the hierarchical levels that is distinct from the first one of the hierarchical levels that includes the executable control flow graph.

3. The computer-implemented method of claim 2, wherein a functional module is configured to perform methods that perform the one or more actions of the functional module, wherein each of the methods configured to be performed is represented in a third one of the hierarchical levels that differs from each of the first one of the hierarchical levels and the second one of the hierarchical levels.

4. The computer-implemented method of claim 3, wherein the specified position is a first specified position, wherein the executable control flow graph includes transitions among the methods configured to be performed, and wherein the method further includes:

configuring the executable control flow graph to interrupt execution of the executable control flow graph at a second specified position that represents a transition to a given method of the functional module, before execution of contents of the given method or a transition from the given method; and at a point of execution representing the second specified position,
interrupting execution of the executable control flow graph and providing data representing one or more attributes of runtime environment in which the given method is executed.

5. The computer-implemented method of claim 4, wherein an attribute of the given method includes a local environment of a system executing the given method.

6. The computer-implemented method of claim 1, wherein a first computer system executes the executable control flow graph, wherein a second computer system executes a spawned process of the given functional module, wherein the first computer system differs from the second computer system, and wherein the method further includes:
responsive to the interrupting, causing display of a user interface that renders one or more visual representations of one or more attributes of a runtime environment of the second computer system.

7. The computer-implemented method of claim 1, further including:
providing a graphical user interface that when rendered on a display device displays one or more controls for configuring interruption of the executable control flow graph.

8. The computer-implemented method of claim 1, further including specifying the position by inserting a breakpoint into the executable control flow graph at the specified position.

9. The computer-implemented method of claim 1, wherein the given functional module is a first functional module, and wherein the method further includes:
while the executable control flow graph is interrupted, modifying one or more values of one or more attributes of the first functional module, wherein the one or more values of those one or more attributes are accessed by one or more second functional modules from the first functional module;
resuming execution of the executable control flow graph; and
modifying behavior of the executable control flow graph by causing the one or more second functional modules to execute with the one or more modified values of the one or more attributes.

10. The computer-implemented method of claim 9, wherein an attribute is a parameter.

11. The computer-implemented method of claim 1, wherein the given functional module is a conditional functional module that is configured to perform one or more first actions upon satisfaction of a condition and to perform one or more second actions upon failure of satisfaction of the condition, wherein the method further includes:
modifying control flow of the executable control flow graph by altering a success or failure state of the conditional functional module.

12. The computer-implemented method of claim 1, wherein the executable control flow graph is configured to loop, and wherein the method further includes:
configuring the executable control flow graph such that each iteration of the loop or a particular iteration of the loop is interrupted before, in or after execution of the executable control flow graph.

13. The computer-implemented method of claim 1, wherein the executable control flow graph includes a sub-executable control flow graph that is configured to loop, and wherein the method further includes:
configuring the sub-executable control flow graph such that each iteration of the loop or a particular iteration of the loop is interrupted.

14. The computer-implemented method of claim 1, further including:
configuring the executable control flow graph such that execution of the executable control flow graph is interrupted at the specified position when a particular condition is satisfied.

15. The computer-implemented method of claim 1, further including:
configuring the executable control flow graph to interrupt execution of the executable control flow graph on failure of any functional module.

16. The computer-implemented method of claim 1, wherein the given functional module is a first functional module that is configured to start a second functional module, and wherein the method further includes:
configuring the executable control flow graph to pause execution at a start of execution of the second functional module.

17. The method of claim 1, wherein the executable control flow graph includes a graphical layer and a control processing layer, wherein the graphical layer includes visuals for the graphical user interface and the visual program in a visual programming language that is programmed with the visuals, with the visual programming language being for specifying the control flow, wherein the control processing layer includes functional modules, methods, underlying data structures used in executing the methods, and code that executes the methods using the underlying data structures to effect the control flow specified by the visual programming language.

18. The method of claim 17, further including:
executing the graphical layer by rendering the graphical user interface with the visuals;
receiving, through the graphical user interface, data representing user manipulation of one or more of the visuals displayed in the graphical user interface, with the received data representing the visual program in the visual programming language; and
executing the control processing layer in accordance with the visual program created in the graphical layer, with execution of the control processing layer including executing one or more functional modules specified by the visual program, with execution of a functional module causing execution of a method of that functional module by executing code using one or more data structures of the method to effect the control flow specified by the visual programming language.

19. The method of claim 18, wherein a particular functional module represents a controlled application included in a data processing layer, wherein the method further includes:
executing a particular method of the particular functional module; and
responsive to executing the particular method, launching the controlled application.

20. One or more machine-readable hardware storage devices for debugging a visual program that includes graphical program elements of an executable control flow graph with one of more functional modules, with the graphical program elements representing the one or more functional modules, with control flow being represented as transitions among the graphical program elements, and with the one or more functional modules specifying controlled applications configured by the executable flow control graph to execute one or more actions on a computer system, the one or more machine-readable hardware storage devices storing instructions that are executable by one or more processors to perform operations including:
rendering, by the visual program in a graphical user interface, at least a portion of the executable control flow graph by rendering one or more of the graphical program elements that represent a given functional module of at least that portion, with the given functional module specifying one or more of the controlled applications to execute the one or more actions;
wherein the given functional module includes a method, which when executed, launches one or more of the controlled applications specified by the given functional module;
inserting, into the visual program, a breakpoint indicator specifying a position in the executable control flow graph at which execution of the executable control flow graph is to be interrupted by inserting the breakpoint indicator into the visual program in juxtaposition to a given graphical element representing the given functional module;
executing the executable control flow graph in an execution environment, including:
executing the method of the given functional module; and
launching the one or more of the controlled applications specified by the given functional module;
interrupting execution of the one or more of the controlled applications launched by execution of the method of the given functional module in the executable control flow graph when execution reaches the specified position in the executable control flow graph; and
debugging the visual program by rendering, by the visual program in the graphical user interface, data representing one or more attributes of the execution environment at the specified position, with regard to the given functional module, in the executable control flow graph being executed in the execution environment.

21. A method for debugging a visual program that includes graphical program elements of an executable control flow graph with one of more functional modules, with-the graphical program elements representing the one or more functional modules, with control flow being represented as transitions among the graphical program elements, and with the one or more functional modules specifying controlled applications configured by the executable flow control graph to execute one or more actions on a computer system, the method including:
rendering, by the visual program in a graphical user interface, at least a portion of the executable control flow graph by rendering one or more of the graphical program elements that represent a given functional module of at least that portion, with the given functional module specifying one or more of the controlled applications to execute the one or more actions;
wherein the given functional module includes a method, which when executed, launches one or more of the controlled applications specified by the given functional module;
inserting, into the visual program, a breakpoint indicator specifying a position in the executable control flow graph at which execution of the executable control flow graph is to be interrupted by inserting the breakpoint indicator into the visual program in juxtaposition to a given graphical element representing the given functional module;
executing the executable control flow graph in an execution environment, including:
  executing the method of the given functional module; and
  launching the one or more of the controlled applications specified by the given functional module;
interrupting execution of the one or more of the controlled applications launched by execution of the method of the given functional module in the executable control flow graph when execution reaches the specified position in the executable control flow graph; and
debugging the visual program by rendering, by the visual program in the graphical user interface, data representing one or more attributes of the execution environment at the specified position, with regard to the given functional module, in the executable control flow graph being executed in the execution environment.

22. A system for debugging a visual program that includes graphical program elements of an executable control flow graph with one of more functional modules, with-the graphical program elements representing the one or more functional modules, with control flow being represented as transitions among the graphical program elements, and with the one or more functional modules specifying controlled applications configured by the executable flow control graph to execute one or more actions on a computer system, the system including:
  one or more processors; and
  one or more machine-readable hardware storage devices storing instructions that are executable by the one or more processors to perform operations including:
    rendering, by the visual program in a graphical user interface, at least a portion of the executable control flow graph by rendering one or more of the graphical program elements that represent a given functional module of at least that portion, with the given functional module specifying one or more of the controlled applications to execute the one or more actions;
    wherein the given functional module includes a method, which when executed, launches one or more of the controlled applications specified by the given functional module;
    inserting, into the visual program, a breakpoint indicator specifying a position in the executable control flow graph at which execution of the executable control flow graph is to be interrupted by inserting the breakpoint indicator into the visual program in juxtaposition to a given graphical element representing the given functional module;
    executing the executable control flow graph in an execution environment, including:
      executing the method of the given functional module; and
      launching the one or more of the controlled applications specified by the given functional module;
    interrupting execution of the one or more of the controlled applications launched by execution of the method of the given functional module in the executable control flow graph when execution reaches the specified position in the executable control flow graph; and
    debugging the visual program by rendering, by the visual program in the graphical user interface, data representing one or more attributes of the execution environment at the specified position, with regard to the given functional module, in the executable control flow graph being executed in the execution environment.

23. One or more machine-readable hardware storage devices for debugging a visual program that includes graphical program elements of an executable control flow graph with one of more functional modules, with the graphical program elements representing the one or more functional modules, with control flow being represented as transitions among the graphical program elements, and with the one or more functional modules specifying controlled applications configured by the executable flow control graph to execute one or more actions on a computer system, the one or more machine-readable hardware storage devices storing instructions that are executable by one or more processors to perform operations including:
  rendering, by the visual program in a graphical user interface, at least a portion of the executable control flow graph by rendering one or more of the graphical program elements that represent a given functional module of at least that portion, with the given functional module specifying one or more of the controlled applications to execute the one or more actions;
  wherein the given functional module includes a method, which when executed, launches one or more of the controlled applications specified by the given functional module;
  inserting, into the visual program, a breakpoint indicator specifying a position in the executable control flow graph at which execution of the executable control flow graph is to be interrupted by inserting the breakpoint indicator into the visual program in juxtaposition to a given graphical element representing the given functional module;
  wherein the specified position represents a first transition to a state in which contents of the given functional module represented by the given graphical program elements are executed, a second transition from the given functional module represented by the given graphical program element, or a third transition to the given functional module represented by the given graphical program element;
  executing the executable control flow graph in an execution environment, including:
    if the specified position represents the first or second transitions,
      executing the method of the given functional module; and
      responsive to executing the method, launching the one or more of the controlled applications specified by the given functional module;
  interrupting execution of the executable control flow graph when execution reaches the specified position in the executable control flow graph;
  debugging the visual program by rendering, by the visual program in the graphical user interface, data representing one or more attributes of the execution environment at the specified position, with regard to the given functional module, in the executable control flow graph being executed in the execution environment; and
  if the specified position represents the third transition,
    continuing execution of the executable control flow graph, including:
      executing the method of the given functional module; and responsive to executing the method, launching the one or more of the controlled applications specified by the given functional module.

24. The one or more machine-readable hardware storage devices of claim 23, wherein a first computer system executes the executable control flow graph, wherein a second computer system executes a spawned process of the given functional module, wherein the first computer system differs from the second computer system, and wherein the operations further include :
responsive to the interrupting, causing display of a user interface that renders one or more visual representations of one or more attributes of a runtime environment of the second computer system.

25. The one or more machine-readable hardware storage devices of claim 23, wherein the operations further include:
providing a graphical user interface that when rendered on a display device displays one or more controls for configuring interruption of the executable control flow graph.

26. The one or more machine-readable hardware storage devices of claim 23, wherein the given functional module is a first functional module, and wherein the operations further include:
while the executable control flow graph is interrupted, modifying one or more values of one or more attributes of the first functional module, wherein the one or more values of those one or more attributes are accessed by one or more second functional modules from the first functional module;
resuming execution of the executable control flow graph; and
modifying behavior of the executable control flow graph by causing the one or more second functional modules to execute with the one or more modified values of the one or more attributes.

27. The one or more machine-readable hardware storage devices of claim 23, wherein the given functional module is a conditional functional module that is configured to perform one or more first actions upon satisfaction of a condition and to perform one or more second actions upon failure of satisfaction of the condition, wherein the operations further include:
modifying control flow of the executable control flow graph by altering a success or failure state of the conditional functional module.

28. A system for debugging a visual program that includes graphical program elements of an executable control flow graph with one of more functional modules, with the graphical program elements representing the one or more functional modules, with control flow being represented as transitions among the graphical program elements, and with the one or more functional modules specifying controlled applications configured by the executable flow control graph to execute one or more actions on a computer system, the system including:
one or more processors; and
one or more machine-readable hardware storage devices storing instructions that are executable by the one or more processors to perform operations including:
rendering, by the visual program in a graphical user interface, at least a portion of the executable control flow graph by rendering one or more of the graphical program elements that represent a given functional module of at least that portion, with the given functional module specifying one or more of the controlled applications to execute the one or more actions;
wherein the given functional module includes a method, which when executed, launches one or more of the controlled applications specified by the given functional module;
inserting, into the visual program, a breakpoint indicator specifying a position in the executable control flow graph at which execution of the executable control flow graph is to be interrupted by inserting the breakpoint indicator into the visual program in juxtaposition to a given graphical element representing the given functional module;
wherein the specified position represents a first transition to a state in which contents of the given functional module represented by the given graphical program elements are executed, a second transition from the given functional module represented by the given graphical program element, or a third transition to the given functional module represented by the given graphical program element;
executing the executable control flow graph in an execution environment, including:
if the specified position represents the first or second transitions,
executing the method of the given functional module; and
responsive to executing the method, launching the one or more of
the controlled applications specified by the given functional module;
interrupting execution of the executable control flow graph when execution reaches the specified position in the executable control flow graph;
debugging the visual program by rendering, by the visual program in the graphical user interface, data representing one or more attributes of the execution environment at the specified position, with regard to the given functional module, in the executable control flow graph being executed in the execution environment; and
if the specified position represents the third transition,
continuing execution of the executable control flow graph, including:
executing the method of the given functional module; and
responsive to executing the method, launching the one or more of
the controlled applications specified by the given functional module.

29. The system of claim 28, wherein a first computer system executes the executable control flow graph, wherein a second computer system executes a spawned process of the given functional module, wherein the first computer system differs from the second computer system, and wherein the operations further include :
responsive to the interrupting, causing display of a user interface that renders one or more visual representations of one or more attributes of a runtime environment of the second computer system.

30. The system of claim 28, wherein the operations further include:
providing a graphical user interface that when rendered on a display device displays one or more controls for configuring interruption of the executable control flow graph.

31. The system of claim 28, wherein the given functional module is a first functional module, and wherein the operations further include:
- while the executable control flow graph is interrupted, modifying one or more values of one or more attributes of the first functional module, wherein the one or more values of those one or more attributes are accessed by one or more second functional modules from the first functional module;
- resuming execution of the executable control flow graph; and
- modifying behavior of the executable control flow graph by causing the one or more second functional modules to execute with the one or more modified values of the one or more attributes.

32. The system of claim 28, wherein the given functional module is a conditional functional module that is configured to perform one or more first actions upon satisfaction of a condition and to perform one or more second actions upon failure of satisfaction of the condition, wherein the operations further include:
- modifying control flow of the executable control flow graph by altering a success or failure state of the conditional functional module.

* * * * *

UNITED STATES PATENT AND TRADEMARK OFFICE
CERTIFICATE OF CORRECTION

PATENT NO. : 10,817,406 B2  
APPLICATION NO. : 15/942022  
DATED : October 27, 2020  
INVENTOR(S) : Joyce L. Vigneau, Mark Staknis and Xin Li Page 1 of 1

It is certified that error appears in the above-identified patent and that said Letters Patent is hereby corrected as shown below:

In the Claims

Column 32, Line 54, Claim 1, delete "one of" and insert -- one or --

Column 35, Line 67, Claim 20, delete "one of" and insert -- one or --

Column 36, Line 47, Claim 21, delete "one of" and insert -- one or --

Column 36, Line 48, Claim 21, delete "with-the" and insert -- with the --

Column 37, Line 25, Claim 22, delete "one of" and insert -- one or --

Column 37, Line 25, Claim 22, delete "with-the" and insert -- with the --

Column 38, Line 8, Claim 23, delete "one of" and insert -- one or --

Column 39, Line 10, Claim 24, delete "include :" and insert -- include: --

Column 39, Line 51, Claim 28, delete "one of" and insert -- one or --

Column 40, Line 57, Claim 29, delete "include :" and insert -- include: --

Signed and Sealed this  
Nineteenth Day of January, 2021

Andrei Iancu  
*Director of the United States Patent and Trademark Office*